United States Patent
Patchava et al.

(10) Patent No.: US 12,095,685 B2
(45) Date of Patent: Sep. 17, 2024

(54) ORTHOGONAL TIME FREQUENCY SPACE PRECODING FOR TRACKING REFERENCE SIGNAL

(71) Applicant: QUALCOMM Incorporated, San Diego, CA (US)

(72) Inventors: Raviteja Patchava, San Diego, CA (US); Jun Ma, San Diego, CA (US); Morteza Soltani, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/658,411

(22) Filed: Apr. 7, 2022

(65) Prior Publication Data

US 2023/0327827 A1    Oct. 12, 2023

(51) Int. Cl.
*H04L 5/00* (2006.01)
*H04B 7/0456* (2017.01)

(52) U.S. Cl.
CPC ......... *H04L 5/0023* (2013.01); *H04B 7/0456* (2013.01); *H04L 5/0046* (2013.01); *H04L 5/0098* (2013.01)

(58) Field of Classification Search
CPC ... H04L 5/0023; H04L 5/0046; H04L 5/0098; H04L 5/0007; H04L 5/005; H04L 27/26132; H04L 27/26134; H04L 27/2639; H04L 27/2613; H04B 7/0456
See application file for complete search history.

(56) References Cited

U.S. PATENT DOCUMENTS

| | | | |
|---|---|---|---|
| 11,616,676 B1* | 3/2023 | Patchava | H04L 27/2655 375/262 |
| 2019/0173630 A1* | 6/2019 | Kons | H04L 5/0051 |
| 2019/0379422 A1* | 12/2019 | Hadani | H04L 5/006 |
| 2023/0155761 A1* | 5/2023 | Patchava | H04L 25/0226 370/330 |

FOREIGN PATENT DOCUMENTS

WO    WO-2021171707 A1    9/2021

OTHER PUBLICATIONS

Bayat M., et al., "Time and Frequency Synchronization for OTFS", IEEE Wireless Communications Letters, IEEE, Piscataway, NJ, USA, vol. 11, No. 12, Oct. 11, 2022, pp. 2670-2674, XP011930024, p. 2670, right-hand column.

(Continued)

*Primary Examiner* — Tejis Daya
(74) *Attorney, Agent, or Firm* — Paul M. McAdams; Harrity & Harrity, LLP

(57) ABSTRACT

Various aspects of the present disclosure generally relate to wireless communication. In some aspects, a first network node may apply an orthogonal time frequency space (OTFS) precoding to a plurality of tracking reference signal (TRS) resource samples allocated in a delay-Doppler domain to obtain a plurality of TRS symbols with the OTFS precoding. The first network node may transmit, to a second network node, a TRS in which the plurality of TRS symbols with the OTFS precoding have a uniform spacing in a time domain. Numerous other aspects are described.

30 Claims, 12 Drawing Sheets

(56) References Cited

OTHER PUBLICATIONS

Das S.S., et al., "Time Domain Channel Estimation and Equalization of CP-OTFS Under Multiple Fractional Dopplers and Residual Synchronization Errors", IEEE Access, IEEE, USA, vol. 9, Dec. 22, 2020, pp. 10561-10576, XP011833399, p. 10562, left-hand column, p. 10572, right-hand column, figure 2, paragraph [0V.C].
International Search Report and Written Opinion—PCT/US2023/062370—ISA/EPO—May 25, 2023.
Raviteja P., et al., "Embedded Delay-Doppler Channel Estimation for Orthogonal Time Frequency Space Modulation", 2018 IEEE 88th Vehicular Technology Conference (VTC—Fall), IEEE, Aug. 27, 2018, pp. 1-5, XP033535455, p. 1, right-hand column, figure 1.
Shen W., et al., "Channel Estimation for Orthogonal Time Frequency Space (OTFS) Massive MIMO", IEEE Transactions on Signal Processing, IEEE, USA, vol. 67, No. 16, Aug. 15, 2019, pp. 4204-4217, XP011735583, Figure 4.
Zhao L., et al., "Sparse Bayesian Learning of Delay-Doppler Channel for OTFS System", IEEE Communications Letters, IEEE Service Center, Piscataway, NJ, US, vol. 24, No. 12, Sep. 2, 2020, pp. 2766-2769, XP011823953, 4 Pages, Figure 1a.
Zhou Z., et al., "Learning to Equalize OTFS", arxiv.org, Cornell University Library, 201 Olin Library Cornell University Ithaca, NY 14853, Jul. 17, 2021, 28 Pages, XP091012831, figure 5, figure 6.
Hadani R., et al., "Orthogonal Time Frequency Space Modulation", IEEE, arXiv:1808.00519v1 [cs.IT], Aug. 1, 2018, pp. 1-13, https:/arxiv_org/abs/1808.00519v1.

* cited by examiner

ORTHOGONAL TIME FREQUENCY SPACE PRECODING FOR TRACKING REFERENCE SIGNAL

INTRODUCTION

Aspects of the present disclosure generally relate to wireless communication and to techniques and apparatuses associated with an orthogonal time frequency space (OTFS) precoding for a tracking reference signal (TRS).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first network node for wireless communication. The first network node may include a memory and one or more processors communicatively coupled to the memory. The one or more processors may be configured to apply an orthogonal time frequency space (OTFS) precoding to a plurality of tracking reference signal (TRS) resource samples allocated in a delay-Doppler domain to obtain a plurality of TRS symbols with the OTFS precoding. The one or more processors may be configured to transmit, to a second network node, a TRS in which the plurality of TRS symbols with the OTFS precoding have a uniform spacing in a time domain.

Some aspects described herein relate to a first network node for wireless communication. The first network node may include a memory and one or more processors communicatively coupled to the memory. The one or more processors may be configured to receive, from a second network node, a TRS that includes a plurality of TRS symbols with an OTFS precoding, wherein the plurality of TRS symbols have a uniform spacing in a time domain. The one or more processors may be configured to decode the TRS based on the OTFS precoding to obtain a plurality of TRS resource samples in a delay-Doppler domain.

Some aspects described herein relate to a method of wireless communication performed by a first network node. The method may include applying an OTFS precoding to a plurality of TRS resource samples allocated in a delay-Doppler domain to obtain a plurality of TRS symbols with the OTFS precoding. The method may include transmitting, to a second network node, a TRS in which the plurality of TRS symbols with the OTFS precoding have a uniform spacing in a time domain.

Some aspects described herein relate to a method of wireless communication performed by a first network node. The method may include receiving, from a second network node, a TRS that includes a plurality of TRS symbols with an OTFS precoding, wherein the plurality of TRS symbols have a uniform spacing in a time domain. The method may include decoding the TRS based on the OTFS precoding to obtain a plurality of TRS resource samples in a delay-Doppler domain.

Some aspects described herein relate to a non-transitory computer-readable medium having instructions for wireless communication stored thereon. The instructions, when executed by a first wireless node, may cause the first wireless node to apply an OTFS precoding to a plurality of TRS resource samples allocated in a delay-Doppler domain to obtain a plurality of TRS symbols with the OTFS precoding; and transmit, to a second network node, a TRS in which the plurality of TRS symbols with the OTFS precoding have a uniform spacing in a time domain.

Some aspects described herein relate to a non-transitory computer-readable medium having instructions for wireless communication stored thereon. The instructions, when executed by a first wireless node, may cause the first wireless node to receive, from a second network node, a TRS that includes a plurality of TRS symbols with an OTFS precoding, wherein the plurality of TRS symbols have a uniform spacing in a time domain; and decode the TRS based on the OTFS precoding to obtain a plurality of TRS resource samples in a delay-Doppler domain.

Some aspects described herein relate to an apparatus for wireless communication. The apparatus may include means for applying an OTFS precoding to a plurality of TRS resource samples allocated in a delay-Doppler domain to obtain a plurality of TRS symbols with the OTFS precoding. The apparatus may include means for transmitting, to a network node, a TRS in which the plurality of TRS symbols with the OTFS precoding have a uniform spacing in a time domain.

Some aspects described herein relate to an apparatus for wireless communication. The apparatus may include means for receiving, from a network node, a TRS that includes a plurality of TRS symbols with an OTFS precoding, wherein the plurality of TRS symbols have a uniform spacing in a time domain. The apparatus may include means for decoding the TRS based on the OTFS precoding to obtain a plurality of TRS resource samples in a delay-Doppler domain.

Aspects generally include a method, apparatus, system, computer program product, non-transitory computer-readable medium, user equipment, base station, transmission reception point, network node, wireless communication device, and/or processing system as substantially described herein with reference to and as illustrated by the drawings and specification.

The foregoing broadly outlines example features and example technical advantages of examples according to the disclosure. Additional example features and example advantages are described herein.

BRIEF DESCRIPTION OF THE DRAWINGS

The drawings illustrate certain example aspects of this disclosure and are therefore not limiting in scope. The same reference numbers in different drawings may identify the same or similar elements.

DETAILED DESCRIPTION

Figure 1:
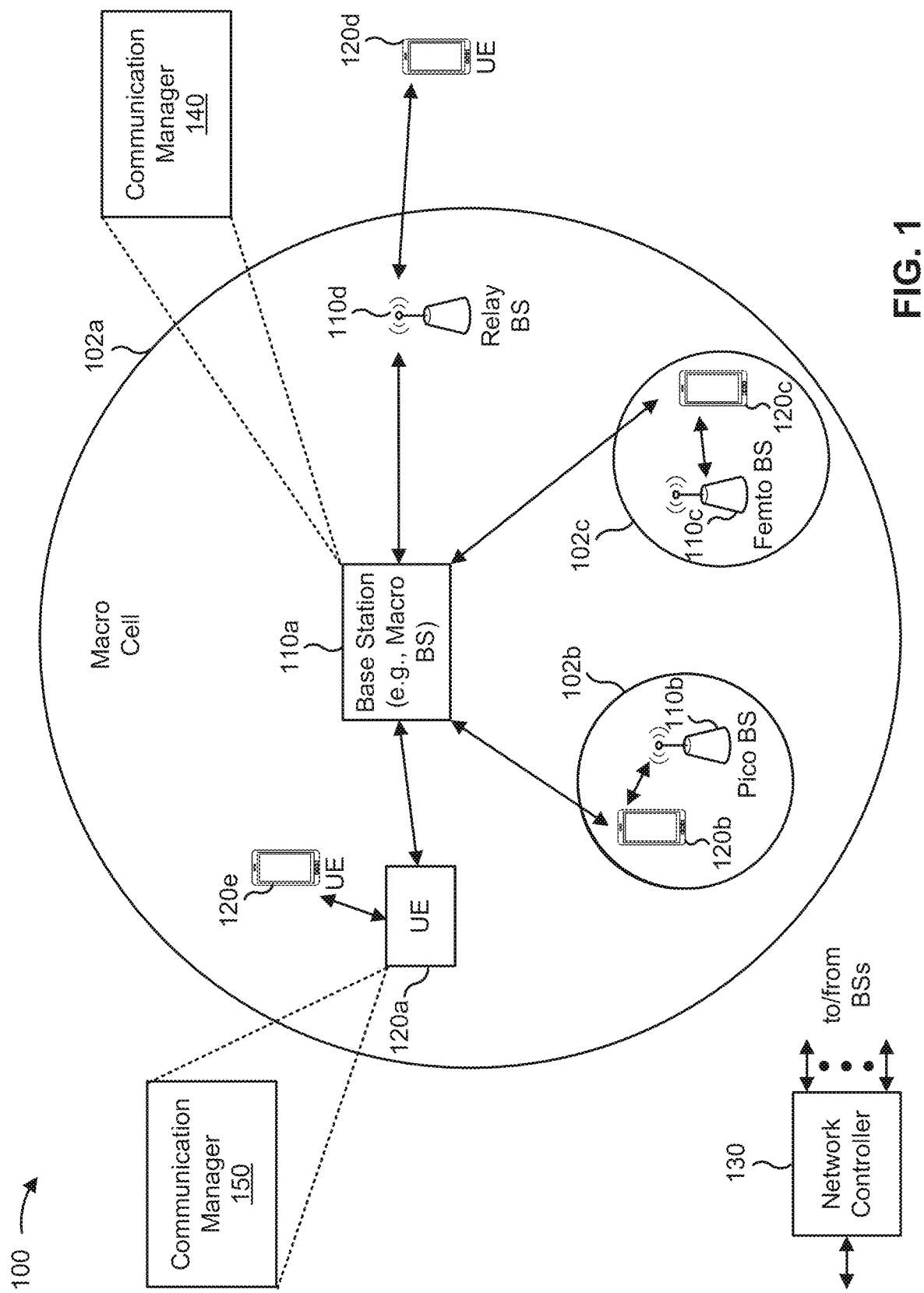
FIG. 1 is a diagram illustrating an example of a wireless network, in accordance with the present disclosure.

Various aspects of the disclosure are described more fully hereinafter with reference to the accompanying drawings. This disclosure may, however, be embodied in many different forms and should not be construed as limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a base station (BS)) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, a first network node (e.g., a base station 110 or TRP) may include a communication manager 140. As described in more detail elsewhere herein, the communication manager 140 may apply an orthogonal time frequency space (OTFS) precoding to a plurality of tracking reference signal (TRS) resource samples allocated in a delay-Doppler domain to obtain a plurality of TRS symbols with the OTFS precoding; and transmit, to a second network node (e.g., a UE 120), a TRS in which the plurality of TRS symbols with the OTFS precoding have a uniform spacing in a time domain. Additionally, or alternatively, the communication manager 140 may perform one or more other operations described herein.

In some aspects, a first network node (e.g., a UE 120) may include a communication manager 150. As described in more detail elsewhere herein, the communication manager 150 may receive, from a second network node (e.g., a base station 110 or TRP), a TRS that includes a plurality of TRS symbols with an OTFS precoding, wherein the plurality of TRS symbols have a uniform spacing in a time domain; and decode the TRS based on the OTFS precoding to obtain a plurality of TRS resource samples in a delay-Doppler domain. Additionally, or alternatively, the communication manager 150 may perform one or more other operations described herein.

As indicated above, FIG. 1 is provided as an example. Other examples may differ from what is described with regard to FIG. 1.

Figure 2:
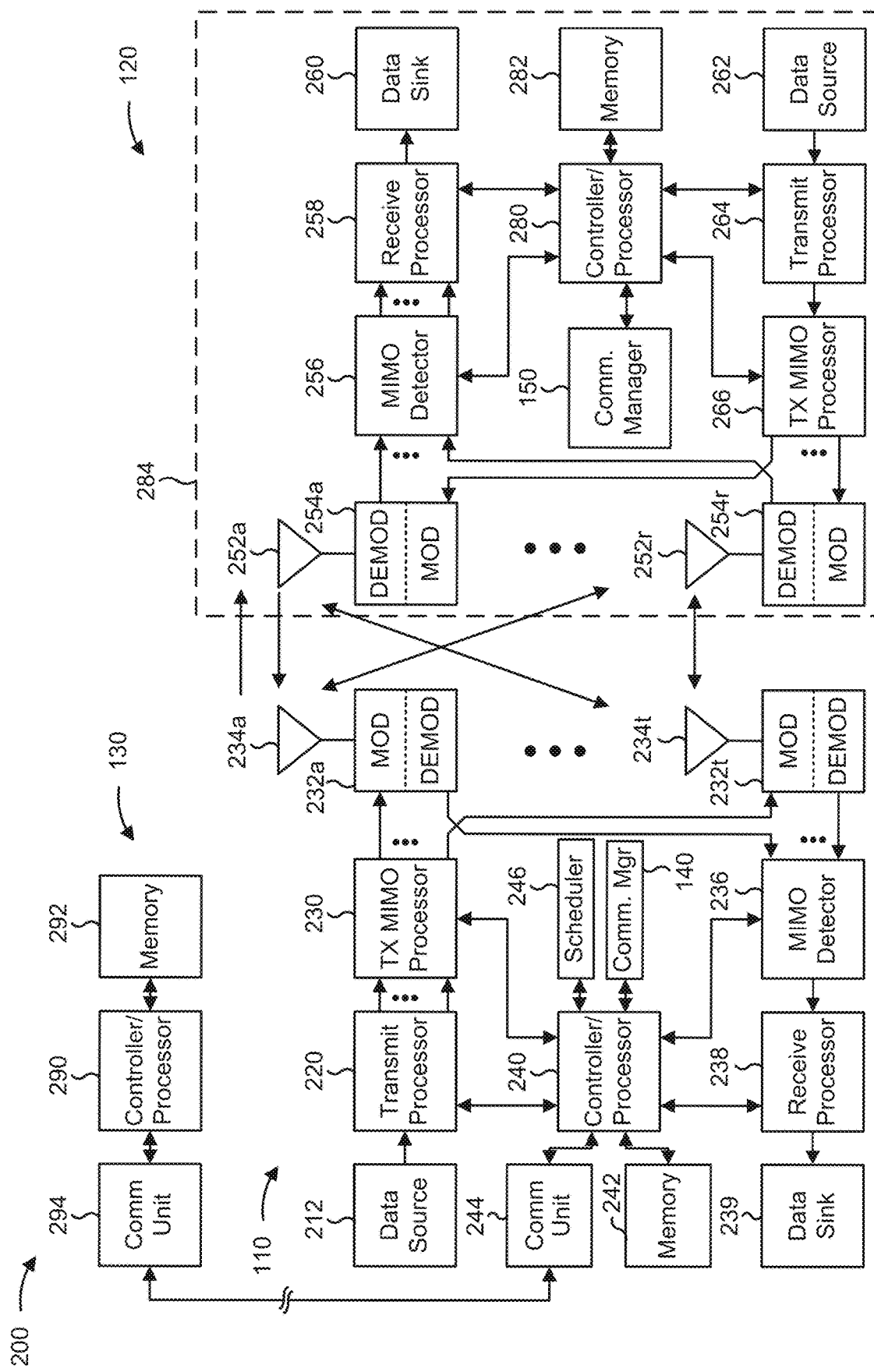
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended or otherwise destined for the UE 120 (or a set of UEs 120). The transmit processor 220 may select one or more modulation and coding schemes (MCSs) for the UE 120 based on one or more channel quality indicators (CQIs) received from that UE 120. The base station 110 may process (e.g., encode and modulate) the data for the UE 120 based on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with an orthogonal time frequency space (OTFS) precoding for a tracking reference signal (TRS), as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first network node (e.g., the base station 110 or a component of the base station 110) includes means for applying an OTFS precoding to a plurality of TRS resource samples allocated in a delay-Doppler domain to obtain a plurality of TRS symbols with the OTFS precoding; and/or means for transmitting, to a second network node (e.g., the UE 120), a TRS in which the plurality of TRS symbols with the OTFS precoding have a uniform spacing in a time domain. In some aspects, the means for the first network node to perform operations described herein may include, for example, one or more of communication manager 140, transmit processor 220, TX MIMO processor 230, modem 232, antenna 234, MIMO detector 236, receive processor 238, controller/processor 240, memory 242, or scheduler 246.

In some aspects, a first network node (e.g., the UE 120) includes means for receiving, from a second network node (e.g., the base station 110 or a component of the base station 110), a TRS that includes a plurality of TRS symbols with an OTFS precoding, wherein the plurality of TRS symbols have a uniform spacing in a time domain; and/or means for decoding the TRS based on the OTFS precoding to obtain a plurality of TRS resource samples in a delay-Doppler domain. In some aspects, the means for the first network node to perform operations described herein may include, for example, one or more of communication manager 150, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
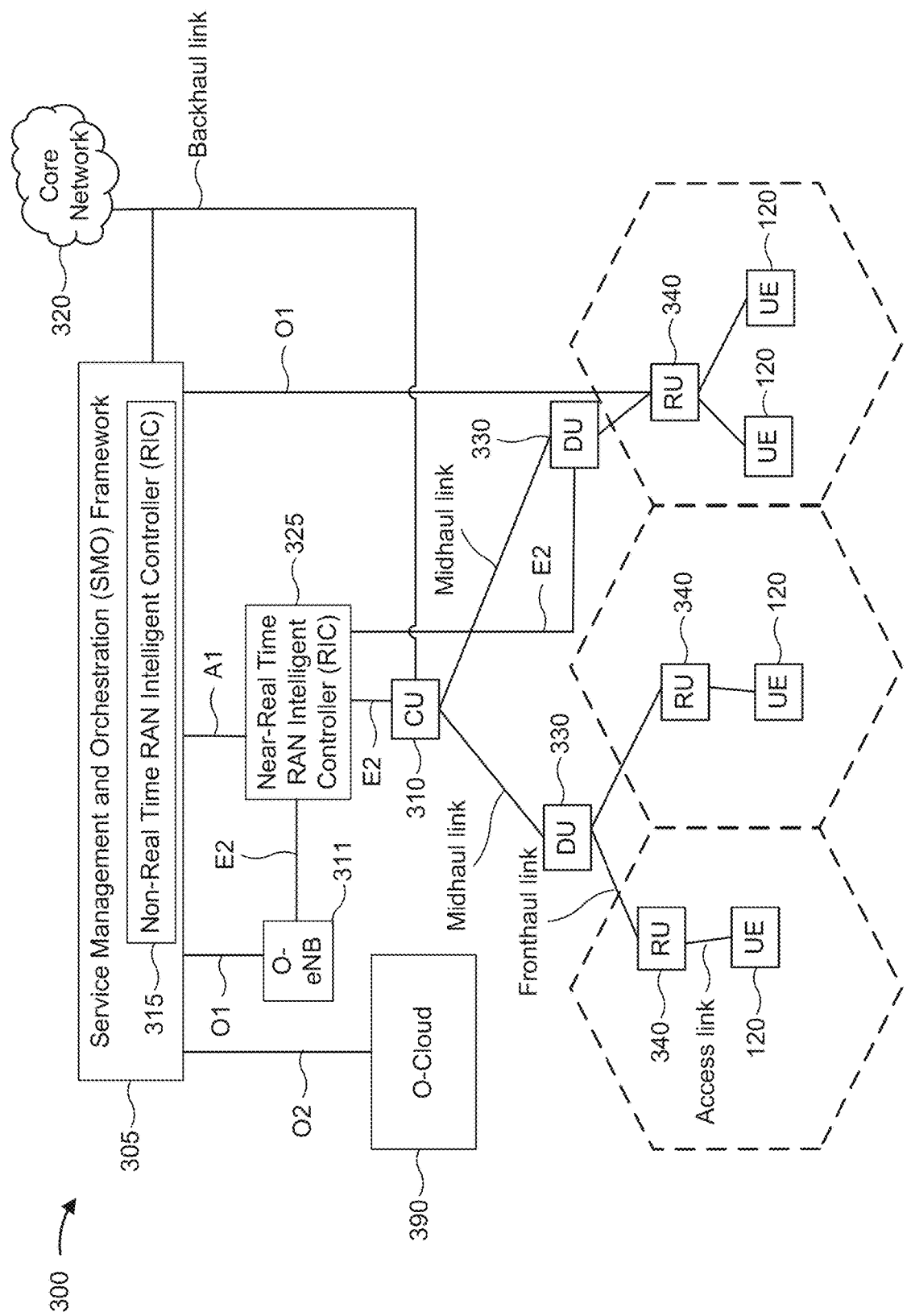
FIG. 3 is a diagram illustrating an example disaggregated base station architecture, in accordance with the present disclosure.

FIG. 3 is a diagram illustrating an example 300 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (e.g., base station 110), or one or more units (or one or more components) performing base station functionality, may be implemented in an aggregated or disaggregated architecture. For example, a base station (e.g., a Node B (NB), an eNB, an NR BS, a 5G NB, an access point (AP), a TRP, a cell, or the like) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., one or more central or centralized units (CUs), one or more distributed units (DUs), and/or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, the DU, and the RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some aspects, the UE 120 may be simultaneously served by multiple RUs 340.

Each of the units (e.g., the CUs 310, the DUs 330, and the RUs 340), as well as the Near-RT RICs 325, the Non-RT RICs 315, and the SMO Framework 305, may include one or more interfaces or may be coupled to one or more interfaces configured to receive and/or transmit signals, data, or information (collectively, signals) via a wired or wireless transmission medium. Each of the units, or an associated processor or controller providing instructions to the communication interfaces of the units, can be configured to communicate with one or more of the other units via the wired or wireless transmission medium. For example, the units can include a wired interface configured to receive signals from or transmit signals to one or more of the other units over a wired transmission medium. Additionally, or alternatively, the units can include a wireless interface, which may include a receiver, a transmitter, or a transceiver (e.g., an RF transceiver), configured to receive signals from and/or transmit signals to one or more of the other units over a wireless transmission medium.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., modules for forward error correction (FEC) encoding and decoding, scrambling, modulation and demodulation, or the like) based on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4A:
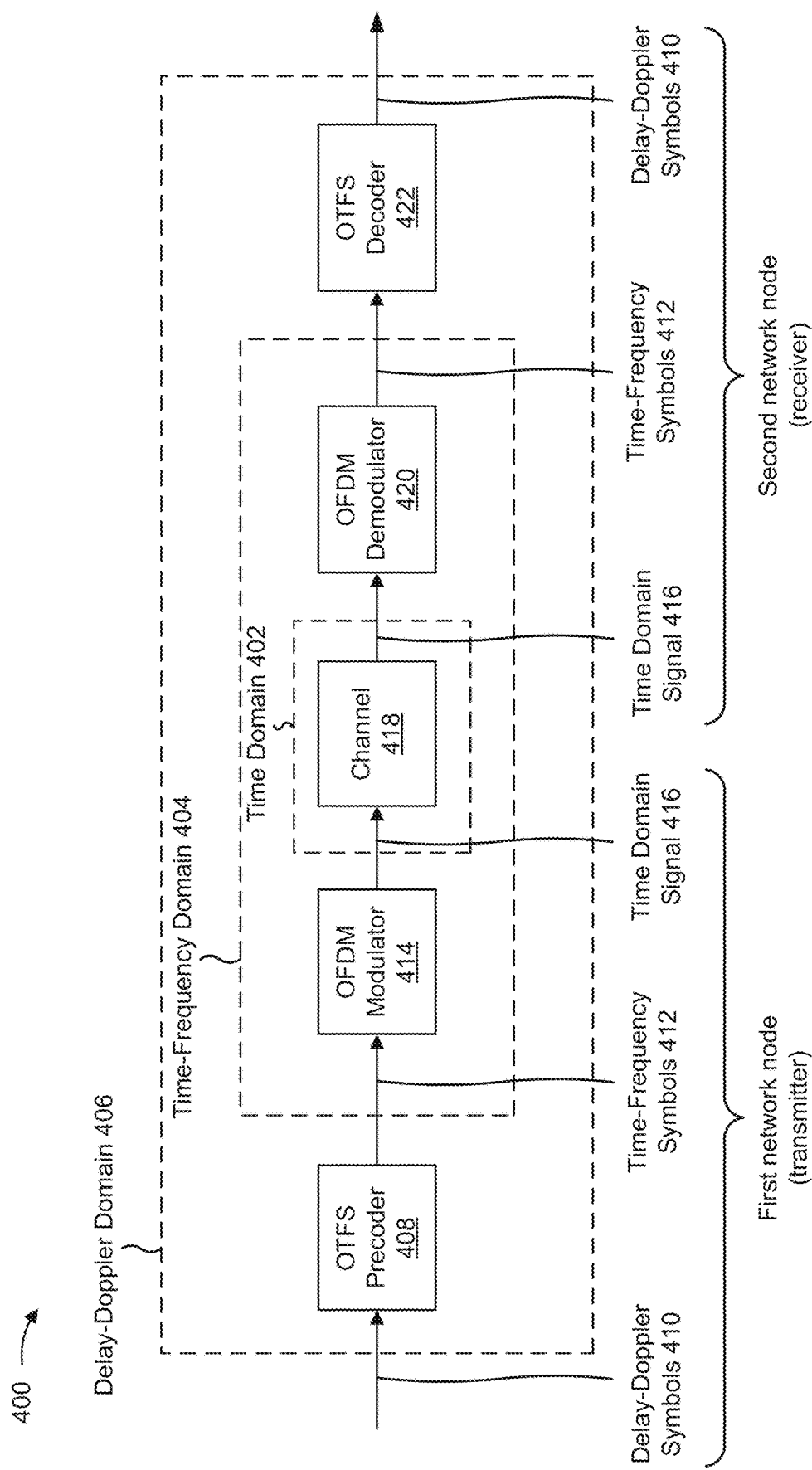
FIGS. 4A-4B are diagrams illustrating examples associated with communication based on an orthogonal time frequency space (OTFS) waveform, in accordance with the present disclosure.
Figure 4B:
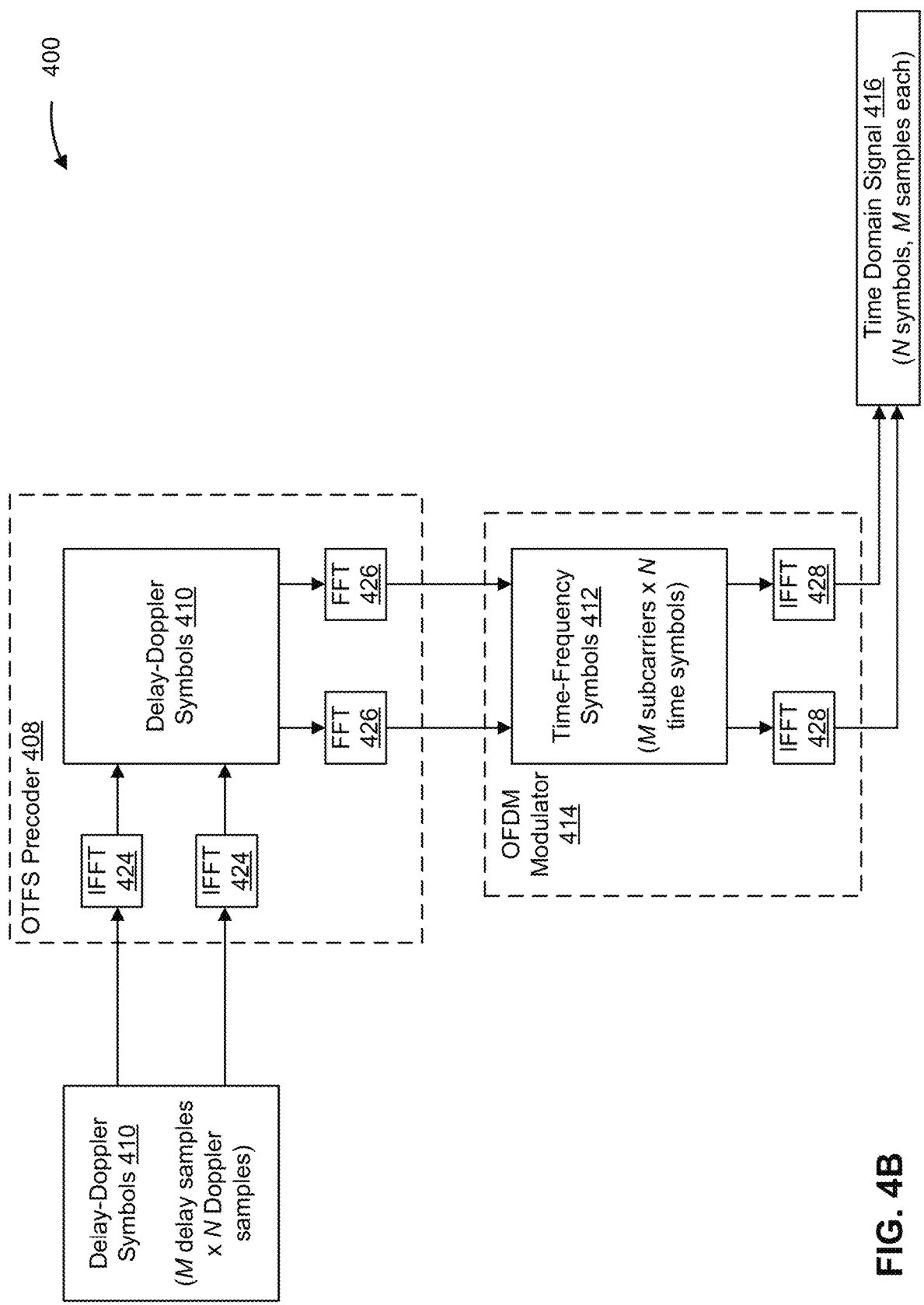

FIGS. 4A-4B are diagrams illustrating examples 400 associated with communication based on an orthogonal time frequency space (OTFS) waveform, in accordance with the present disclosure.

In a wireless network, such as an NR network, wireless communication may be based on orthogonal frequency division multiplexing (OFDM) modulation and demodulation. For example, in OFDM, multiple closely spaced orthogonal subcarrier signals with overlapping spectra are transmitted to carry data in parallel, demodulation is based on FFT algorithms, and a guard interval precedes the beginning of each symbol to improve orthogonality in transmission channels that may be affected by multipath propagation. In OFDM techniques, each subcarrier (or signal) is modulated using a modulation scheme (e.g., quadrature amplitude modulated (QAM) or phase-shift keying) at a low symbol rate, which maintains total data rates at a level similar to single-carrier modulation schemes in the same bandwidth. Accordingly, relative to single-carrier schemes, OFDM techniques may tolerate severe channel conditions (e.g., attenuation of high frequencies, narrowband interference, and/or frequency-selective fading due to multipath) without requiring complex equalization filters. The low symbol rate enables the use of a guard interval between symbols to eliminate inter-symbol interference (ISI) and use echoes and time-spreading to achieve a diversity gain (e.g., a signal-to-noise ratio (SNR) improvement). This mechanism also facilitates a single frequency network (SFN) where several adjacent transmitters send the same signal simultaneously at the same frequency, as the signals from multiple distant transmitters may be constructively recombined at the receiver.

In some cases, however, OFDM modulation and demodulation of wireless communications may be susceptible to high residual frequency offset and/or large Doppler spread. These issues can occur, for example, in high-Doppler environments such as high-speed train (HST) or high-speed rail (HSR) communications, V2X communications, high-speed vehicle communications, and/or other high-mobility communication environments in which channel conditions in a wireless network rapidly change. Frequency offset and/or large Doppler spread may result in inter-carrier interference (ICI) (e.g., power leakage among sub-carriers) for wireless communications that use OFDM modulation and demodulation. A wireless channel may function as a linear time-variant channel in a high-mobility communication environment, as opposed to a linear time-invariant channel that is assumed for OFDM modulation and demodulation. As a result, frequency dispersion and/or time dispersion in a high-mobility communication environment, resulting from high residual frequency offset and/or large Doppler spread, can result in a breakdown in orthogonality in OFDM modulation and demodulation, which causes increased ICI. Increased ICI may result in decreased channel estimation accuracy, which may cause a decrease in robustness of communications, an increase in dropped or undecodable communications, and/or an increase in retransmissions, among other examples. An increase in retransmissions may result in increased consumption of processing, memory, and/or radio resources for UEs, base stations, TRPs, CUs, DUs, RUs, and/or other nodes in a wireless network.

Accordingly, in some aspects described herein, OTFS precoding and OTFS decoding may be used to mitigate and/or reduce the effects of high residual frequency offset and/or large Doppler shift that can occur for wireless communications in high-mobility communication environments. As described in further detail herein, a first network node that is transmitting a signal to a second network node may apply an OTFS precoding to resource samples that are allocated in a delay-Doppler domain (e.g., using an OTFS precoder). In particular, the first network node, which may be referred to herein as a transmitter node, may apply the OTFS precoding to the resource samples that are allocated in the delay-Doppler domain to transform the resource samples from the delay-Doppler domain to symbols in a time-frequency domain. The transmitter node may modulate the symbols using OFDM to further transform the symbols from the time-frequency domain to the time domain for transmission over a wireless channel. The second network node, which may be referred to herein as a receiver node, may receive the symbols and may perform reverse operations to demodulate and decode the transmission (e.g., using an OTFS decoder).

OTFS precoding and decoding of transmissions over a wireless channel may provide constant fading and multipath diversity, as well as sparse and stable channel occupation, which enables joint time-frequency diversity for the transmissions. OTFS precoding and decoding may also enable a reduced peak-to-average-power ratio (PAPR), greater power transmission efficiency, and/or reduced cyclic prefix overhead, among other examples. This may decrease ICI for transmissions in high-mobility communication environments. In this way, robustness of communications may be increased, dropped or undecodable communications may be decreased, and/or retransmissions may be decreased, among other examples.

More particularly, as shown in FIG. 4A, communication between the transmitter node and the receiver node may be performed in a time domain 402. A signal to be transmitted by the transmitter node to the receiver node may be converted or transformed to the time domain 402 from one or more other domains, such as a time-frequency domain 404 and a delay-Doppler domain 406. The signal transmitted from the transmitter node to the receiver node may be an uplink communication (e.g., a sounding reference signal (SRS) transmission, a physical uplink control channel (PUCCH) communication, or a physical uplink shared channel (PUSCH) communication), a downlink communication (e.g., a tracking reference signal (TRS) transmission, a physical downlink control channel (PDCCH) communication, or a physical downlink shared channel (PDSCH) communication), a sidelink communication (e.g., a physical sidelink control channel (PSCCH) communication, or a physical sidelink shared channel (PSSCH) communication), or another suitable type of communication.

As further shown in FIG. 4A, the transmitter node may include an OTFS precoder 408, which may receive a plurality of delay-Doppler symbols (or resource samples) 410 of the communication and convert the delay-Doppler symbols 410 from the delay-Doppler domain 406 to the time-frequency domain 404. In particular, the OTFS precoder 408 may convert or transform the delay-Doppler symbols 410 to time-frequency symbols 412. The delay-Doppler symbols 410 include a block of M×N delay-Doppler QAM symbols that are discretized to an M by N delay-Doppler plane that includes M delay samples and N Doppler shift samples. The time-frequency symbols 412 include a block of M×N OFDM modulated symbols that are spread across M sub-carriers and N time symbols.

As further shown in FIG. 4A, the transmitter node may include an OFDM modulator 414. The OFDM modulator 414 may convert or transform the time-frequency symbols 412 from the time-frequency domain 404 to the time domain 402.

In particular, the OFDM modulator 414 modulates the time-frequency symbols 412 using an OFDM technique to generate a time domain signal 416 that includes the information of the signal to be transmitted to the receiver node. The time domain signal 416 includes a time-varying signal that includes N symbols, each including M samples. The transmitter node may transmit the time domain signal 416 over a channel 418 (e.g., a wireless channel).

The receiver node receives the time domain signal 416 over the channel 418 from the transmitter node. The receiver node may include an OFDM demodulator 420 that converts or transforms the time domain signal 416 from the time domain 402 to the time-frequency domain 404. In particular, the OFDM demodulator 420 demodulates the time domain signal 416 using an OFDM technique to convert or transform the time domain signal 416 to the time-frequency symbols 412. The receiver node further includes an OTFS decoder 422. The OTFS decoder 422 may convert or transform the time-frequency symbols 412 from the time-frequency domain 404 to the delay-Doppler domain 406. In particular, the OTFS decoder 422 may decode the time-frequency symbols 412 to obtain the delay-Doppler symbols 410.

As shown in FIG. 4B, the OTFS precoder 408 may apply or use a two-dimensional (2D) FFT, referred to as an inverse symplectic FFT (ISFFT), to convert the delay-Doppler symbols 410 to the time-frequency symbols 412. However, other 2D transforms may be used for OTFS precoding to transform or convert the delay-Doppler symbols 410 to the time-frequency symbols 412.

An ISFFT is a 2D transform that includes an inverse FFT (IFFT) 424 and an FFT 426, where the IFFT 424 is applied in one dimension of a delay-Doppler matrix and the FFT 426 is applied in a second dimension of the delay-Doppler matrix. The OTFS precoder 408 uses the IFFT 424 on the M delay samples of the delay-Doppler symbols 410 and uses the FFT 426 on the N Doppler samples of the delay-Doppler symbols 410 to generate the time-frequency symbols 412. The time-frequency symbols 412 are provided to the OFDM modulator 414. The OFDM modulator 414 includes an IFFT 428 that is used to modulate the time-frequency symbols 412 to generate the time domain signal 416. Note that while the example in FIG. 4B illustrates the M delay samples of the delay-Doppler symbols 410 are mapped first and the N Doppler samples of the delay-Doppler symbols 410 are mapped second, the N Doppler samples of the delay-Doppler symbols 410 may be mapped first and the M delay samples of the delay-Doppler symbols 410 may be mapped second. The order has little to no effect on the OTFS precoding performance due to the joint detection in OTFS and constant delay-Doppler channel throughout OTFS. The mapping order can be configured by a base station, can be defined in a wireless communication standard or specification (e.g., a 3GPP specification), and/or negotiated among a UE and a base station, among other examples.

The OFDM demodulator 420 and the OTFS decoder 422 of the base station 110 may perform reverse operations of those shown in FIG. 4B to demodulate and decode the uplink communication. However, the OTFS decoder 422 uses a symplectic FFT (SFFT) (instead of an ISFFT) to convert the time-frequency symbols 412 to the delay-Doppler symbols 410. The SFFT includes a 2D transform similar to the ISFFT, but a non-inverse version. In some aspects, the OTFS decoder 422 uses another type of 2D transform to convert the time-frequency symbols 412 to the delay-Doppler symbols 410.

As indicated above, FIGS. 4A and 4B are provided as examples. Other examples may differ from what is described with respect to FIGS. 4A and 4B.

Figure 5:
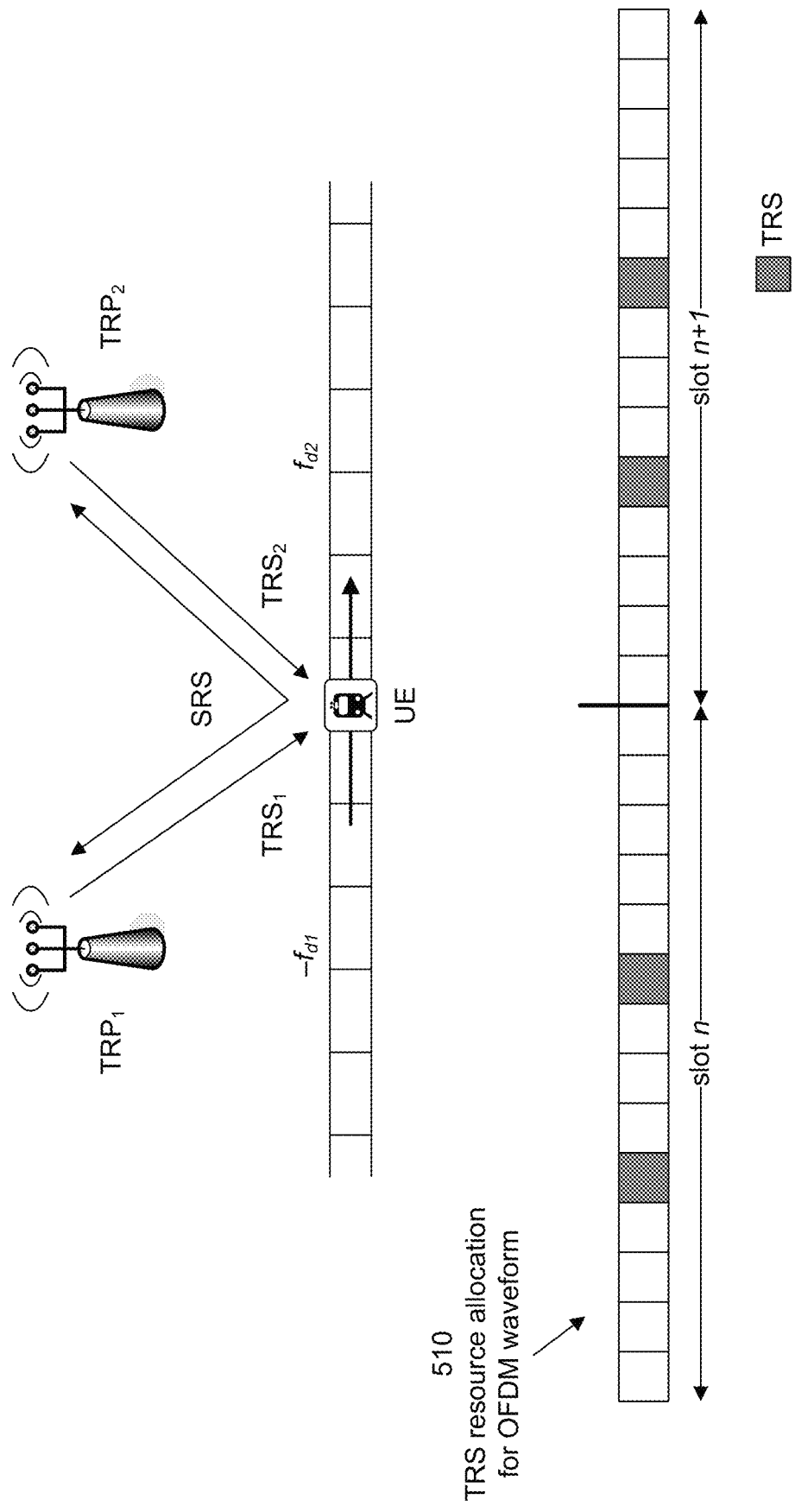
FIG. 5 is a diagram illustrating an example of orthogonal frequency division multiplexing for a tracking reference signal (TRS), in accordance with the present disclosure.

FIG. 5 is a diagram illustrating an example 500 of OFDM for a tracking reference signal (TRS), in accordance with the present disclosure. As shown in FIG. 5, example 500 relates to a scenario in which a TRS is used to improve downlink performance for a UE communicating with multiple TRPs (e.g., different DUs and/or RUs associated with a base station or another suitable network node) while moving at a high speed. For example, in 5G NR wireless communication systems, one target use case is to provide high-bandwidth high-capacity wireless access to devices moving at extreme velocities, such as a high-speed train (HST) scenario where a UE is mounted on or traveling in a train moving at a speed that may exceed 350 kilometers per hour. At very high speeds, wireless communication performance may be poor due to factors such as high Doppler shifts, inter-carrier interference (ICI), and/or difficulties in channel measurements needed to demodulate downlink signals and obtain mobility measurements, among other examples.

Accordingly, one technique that may be used to improve wireless performance when communicating with a UE moving at a high velocity may be to use a single frequency network (SFN), where different TRPs transmit the same information using the same time and frequency resources. For example, in the HST-SFN scenario shown in FIG. 5, each TRP that communicates with a UE mounted on or traveling in an HST may transmit a DMRS and a physical downlink shared channel (PDSCH) in an SFN manner (e.g., using the same time and frequency resources), which can offer advantages such as better coverage, less interference, and higher reliability. However, in an HST-SFN scenario and/or other scenario(s) where a fast-moving UE communicates with multiple TRPs, RUs, or other network nodes, multiple wireless links will lead to downlink signals from different TRPs having different frequency offsets when the downlink signals arrive at the UE. Accordingly, while various TRPs may transmit a DMRS and PDSCH to a fast-moving UE in an SFN manner, different TRPs may each be configured to transmit a TRS in a TRP-specific, non-SFN manner (e.g., a first TRP, shown as $TRP_1$, transmits a first TRS that is orthogonal to a second TRS transmitted by a second TRP, shown as $TRP_2$). For example, as described herein, a TRS is a sparse reference signal designed to assist a UE in performing a tracking operation, such as time tracking, frequency tracking, estimated Doppler tracking, and/or delay spread tracking.

For example, in FIG. 5, reference number 510 depicts an OFDM resource allocation associated with a TRS in a time-frequency domain. For example, in the time domain, the TRS may be periodic or aperiodic, and is generally placed in either four (4) OFDM symbols in two (2) consecutive slots or in two (2) OFDM symbols in one (1) slot. Furthermore, in a frequency domain, the TRS is uniformly placed across an allocated bandwidth with a density of three (3) resource elements per resource block (e.g., the TRS occupies one out of every four resource elements).

In some aspects, when performing a tracking operation, the UE may use the TRP-specific TRS transmissions to estimate a Doppler frequency at the UE per TRP. For example, in the HST-SFN scenario shown in FIG. 5, the UE may estimate a Doppler frequency from the first TRP based on the first TRS transmitted by the first TRP and may estimate a Doppler frequency from the second TRP based on the second TRS transmitted by the second TRP. Accordingly, the UE may then transmit a sounding reference signal (SRS) to the first TRP and the second TRP to indicate the estimated Doppler frequency per TRP. For example, the estimated Doppler frequency may be indicated implicitly by transmitting the SRS at a frequency of $f_c+(d_{d2}-f_{d1}/2)$, where $f_c$ is a center carrier frequency, $f_{d1}$ is the estimated Doppler frequency from the first TRP, and $f_{d2}$ is the estimated Doppler frequency from the second TRP. Alternatively, the SRS transmitted to the first TRP and the second TRP may explicitly indicate the estimated Doppler frequency associated with each respective TRP. In either case, the first TRP and the second TRP may then use the estimated Doppler frequency to pre-compensate PDSCH and DMRS transmissions to be performed in an SFN manner (e.g., such that the PDSCH and DMRS transmissions from the first TRP and the second TRP may be constructively recombined at the UE).

In general, existing wireless networks typically use an OFDM-based TRS transmission, such as the OFDM-based resource allocation shown in FIG. 5. However, for the reasons discussed above with reference to FIGS. 4A-4B, a UE may be unable to accurately estimate the Doppler from different TRPs from OFDM-based TRS transmissions due to the ICI at high Dopplers in high-mobility communication environments. Accordingly, in some aspects, an OTFS waveform may be used for TRS transmissions to handle high Doppler spread channels by transmitting TRS information symbols in a delay-Doppler domain rather than the time-frequency domain (e.g., using the OTFS precoding and OTFS decoding techniques described above with reference to FIGS. 4A-4B), which may enable the UE to estimate the Doppler frequency from each TRP more accurately. In addition, compared to an OFDM-based TRS transmission, an OTFS-precoded TRS transmission may offer advantages such as constant fading, multi-path diversity, and support for SFN and non-SFN TRS transmissions (e.g., OFTS-precoded TRS transmissions do not need to be orthogonal and may be transmitted using the same time and frequency resources). However, the current OFDM-based resource allocation for a TRS may not support an OTFS waveform because OTFS resource samples need to be placed uniformly in the time-frequency domain (e.g., the OTFS waveform is dependent on a symmetric structure for time and frequency allocations). For example, as shown by reference number 510, the TRS symbols are not symmetrically placed, as there are three symbols between the first and second TRS symbols, nine symbols between the second and third TRS symbols, and three symbols between the third and fourth TRS symbols. Accordingly, some aspects described herein relate to TRS resource allocations that may support an OTFS-precoded TRS to enable improved Doppler frequency estimation in HST or other high mobility scenarios.

As indicated above, FIG. 5 is provided as an example. Other examples may differ from what is described with regard to FIG. 5.

Figure 6:
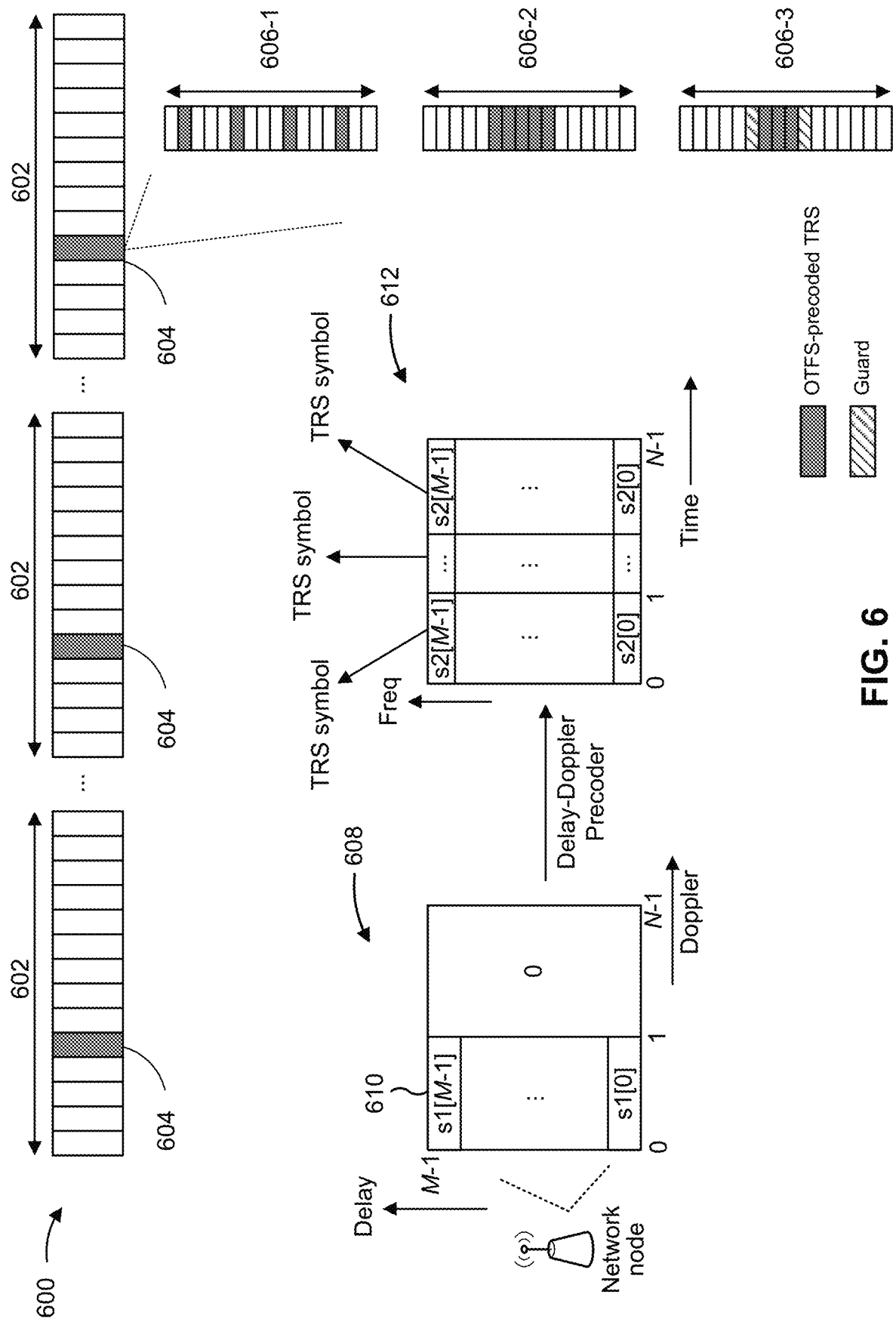
FIGS. 6-7 are diagrams illustrating examples associated with an OTFS precoding for a TRS, in accordance with the present disclosure.

FIG. 6 is a diagram illustrating an example 600 associated with an OTFS precoding for a TRS, in accordance with the present disclosure. In particular, example 600 includes an example of OTFS precoding for a TRS transmissions by a network node (e.g., a TRP, RU, base station, or the like) to a UE (not explicitly shown).

In some aspects, the network node may be configured to transmit a TRS transmission to a UE in one or more slots 602 that each include one or more symbols 604 that include a TRS resource for the TRS transmission. In some aspects, the network node may perform operations described above in connection with FIGS. 4A-4B to apply an OTFS precoding to the TRS transmission using a delay-Doppler precoder such as an ISFFT. Thus, in some aspects, the one or more symbols 604 may be referred to as TRS symbols or OTFS-precoded TRS symbols. In some aspects, as described herein, each slot 602 may contain one or more OTFS-precoded TRS symbols 604, which have a uniform spacing in a time domain (e.g., are placed at uniform intervals) to improve estimation of a Doppler frequency by the UE receiving the TRS transmission.

For example, in FIG. 6, the TRS is transmitted in a plurality of slots 604 that each include a single OTFS-precoded symbol TRS 604, and the OTFS-precoded TRS symbols 604 repeat uniformly (e.g., in the fifth symbol of each slot 602 in the illustrated example) with a period that is either four times smaller or two times smaller than an OFDM-based TRS resource allocation in order to ensure that the OTFS-precoded TRS has the same total number of TRS symbols as an OFDM-based TRS. For example, in cases where an OFDM-based TRS resource allocation includes a TRS placed in 4 OFDM symbols in 2 consecutive slots, an OTFS-precoded TRS with one TRS symbol per slot may include four slots 602 that each include one TRS symbol 604, two slots 602 that each include two TRS symbols 604, or the like, with the TRS symbols having a uniform spacing in the time domain. Accordingly, because the TRS resources are allocated in the delay-Doppler domain, the UE receiving the OTFS-precoded TRS transmission may accurately detect and estimate the Doppler frequencies from different TRPs or other network nodes even in cases where the OTFS-precoded TRS transmissions are transmitted in an SFN manner (e.g., using the same time and frequency resources).

In some aspects, in a frequency domain, the OTFS-precoded TRS transmission may have a discontinuous resource allocation or a continuous resource allocation. For example, as shown in FIG. 6, reference number 606-1 depicts an example of a discontinuous resource allocation in the frequency domain, where the TRS symbols occupy a discontinuous plurality of subcarriers that have a uniform spacing in the frequency domain. For example, the TRS symbols may have a density of three resource elements per resource block, whereby the TRS symbols occupy one out of every four subcarriers. Alternatively, reference number 606-2 depicts an example of a continuous resource allocation in the frequency domain, where the OTFS-precoded TRS symbols have a uniform spacing in the time domain and occupy a continuous plurality of subcarriers in the frequency domain. In this case, the continuous frequency allocation for the OTFS-precoded TRS may be useful to avoid ICI from other resource subcarriers in high Doppler environments, such as an HST, which helps to improve the accuracy of Doppler frequency estimations. For example, when the TRS symbols have a discontinuous allocation in the frequency domain (e.g., as shown by reference number 606-1), data may be carried in the unshaded subcarriers between the shaded subcarriers that carry the OTFS-precoded TRS, which may result in the OTFS-precoded TRS experiencing ICI from the data resources. On the other hand, when the TRS symbols have a continuous allocation in the frequency domain (e.g., as shown by reference number 606-2), other than ICI at the edges of the continuous frequency allocation there is only ICI between the TRS resources, which can be handled by OTFS equalization at the receiving UE. However, because the TRS resources are continuous and not spread across the full bandwidth, the continuous frequency allocation may result in a lower delay resolution. Accordingly, in some aspects, the continuous frequency allocation for the OTFS-precoded TRS may be used in cases where the delay spread is low (e.g., is less than or equal to a threshold). For example, an OTFS-precoded TRS with a continuous frequency allocation may be suitable for an HST or other high mobility scenario where a delay spread is low and Doppler spread is high. Similarly, the continuous frequency allocation for the OTFS-precoded TRS may be unsuitable in cases where the delay spread is high. Furthermore, in cases where a continuous allocation is used in the frequency domain, edge subcarriers of the continuous allocation may be occupied by guard symbols at both edges to protect against the ICI at the edges of the continuous allocation, as shown by reference number 606-3. As an example, the continuous allocation in the frequency domain may include 1 to X subcarriers, where X is an integer greater than 1, in which case the edge subcarriers include subcarrier 1 and subcarrier X In this case, the guard symbols may be zeros or a cyclic prefix portion of the TRS, which may help to avoid ICI from data in neighboring resources at the edges.

As further shown in FIG. 6, in order to obtain the repetition pattern in the time domain by applying an ISFFT or OTFS precoding (e.g., where TRS symbols generally have a uniform spacing in the time domain), the network node may generate a delay-Doppler matrix 608 (e.g., an ISFFT matrix) for a TRS transmission to be performed by the network node. As shown, the delay-Doppler matrix 608 may include a plurality of columns and a plurality of rows. The columns of the delay-Doppler matrix 608 may correspond to 0 through M−1 delay resources and the rows of the delay-Doppler matrix 608 may correspond to 0 through N−1 Doppler resources. Here, M corresponds to the total quantity of frequency resources allocated for TRS in a TRS symbol 604 and N corresponds to the total quantity of slots 602 allocated for the TRS.

In the Doppler domain, the network node may map the TRS resource samples to be transmitted to a first Doppler resource column (e.g., Doppler resource 1) of the delay-Doppler matrix 608, and the network node may assign or use zero (0) values in the remaining 2 through N−1 Doppler resource columns. The purpose of using 0 values for the remaining Doppler resource columns is that, after performing an M×N ISFFT on the delay-Doppler matrix 608 to apply an OTFS precoding to the TRS resource samples that are allocated in the delay-Doppler domain, the pattern of the TRS transmission in the first Doppler column will be repeated across the time domain such that the TRS transmission occupies the full spectrum of frequency domain resources and time domain resources allocated for TRS in the symbol 604. In the delay domain, the network node may map the TRS transmission to a subset 610 of delay resources (e.g., s1 [0] to s1 [M−1] resources, where M corresponds to the quantity of delay resources) in the first Doppler resource column of the delay-Doppler matrix 608.

As further shown in FIG. 6, the network node may precode the TRS transmission (e.g., after mapping the TRS transmission to the delay-Doppler matrix 608) using a delay-Doppler precoder (e.g., an ISFFT precoder). In particular, as further shown in FIG. 6, the network node may precode the TRS transmission using the delay-Doppler precoder to transform the delay-Doppler matrix 708 to a time-frequency matrix 612. For example, the network node may transform (e.g., using an OFDM modulator) the delay-Doppler matrix 608 to the time-frequency matrix 612 using one or more techniques described above in connection with FIGS. 4A-4B. For example, the network nod may transform (e.g., using an ISFFT) the delay-Doppler symbols of the TRS transmission mapped to the time-frequency matrix 612 to generate a plurality of TRS symbols in the time-frequency domain, where the plurality of TRS symbols occupy the N time domain resources and the M frequency domain resources of the time-frequency matrix 612 (e.g., s2[0] through s2[M−1]). In some aspects, the network node may then transform the plurality of TRS symbols from the time-frequency domain to the time domain to generate a time domain signal for the TRS transmission. The network node may transmit the time domain signal of the TRS transmission to the UE in the plurality of symbols 604 that are uniformly spaced in the time domain.

Accordingly, the UE may receive the time domain signal of the TRS transmission in the plurality of symbols 604 that are uniformly spaced in the time domain, and the UE may decode the TRS transmission using a delay-Doppler decoder (e.g., an SFFT). The UE may decode the TRS transmission using one or more techniques described above in connection with FIGS. 4A-4B. For example, the UE may transform the time domain signal of the TRS transmission to a plurality of time-frequency domain symbols using an OFDM demodulator, and may transform the plurality of time-frequency domain symbols to a plurality of delay-Doppler samples using an OTFS decoder.

As indicated above, FIG. 6 is provided as an example. Other examples may differ from what is described with regard to FIG. 6.

Figure 7:
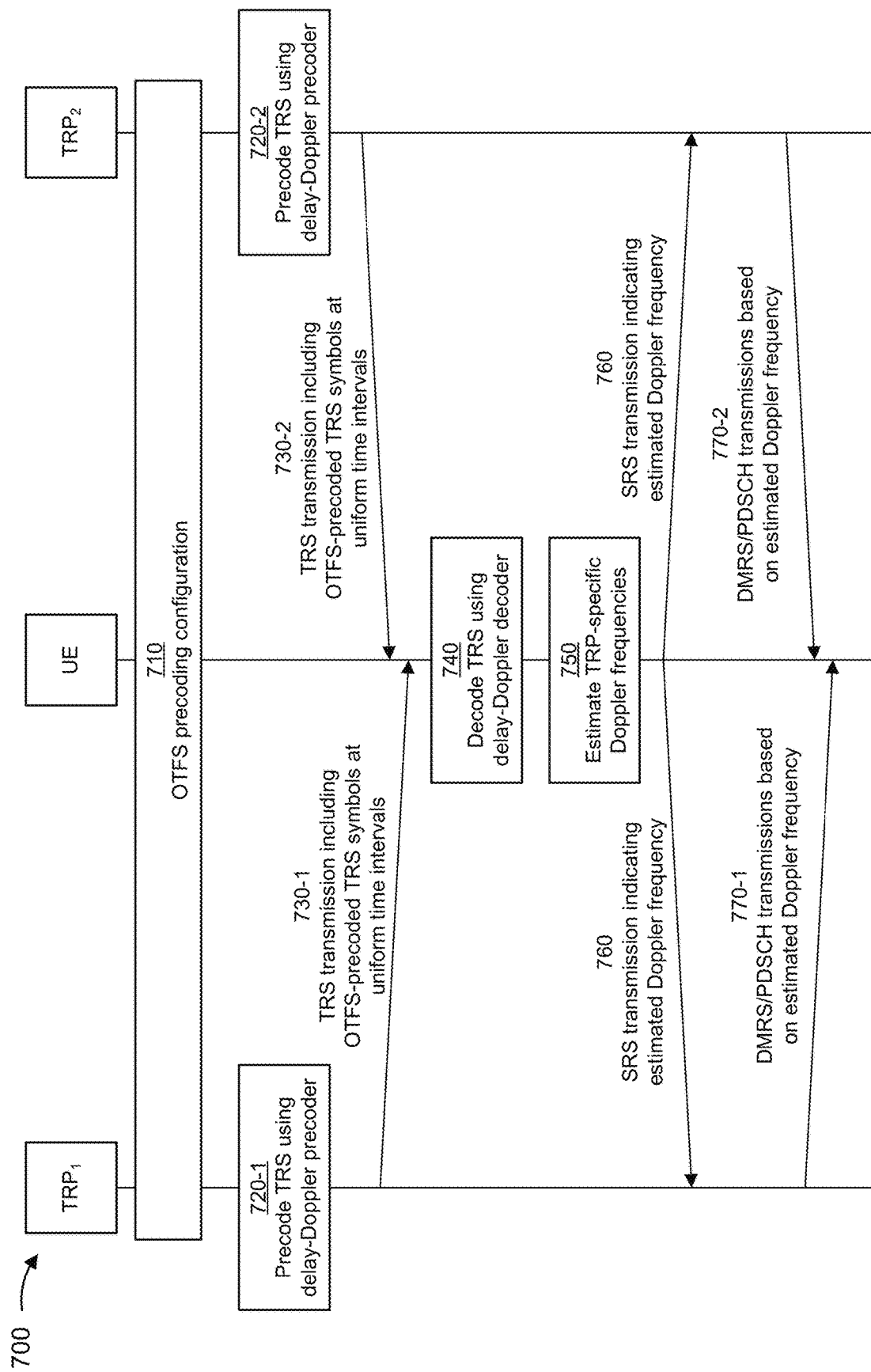

FIG. 7 is a diagram illustrating an example 700 associated with an OTFS precoding for a TRS, in accordance with the present disclosure. As shown in FIG. 7, example 700 includes a UE communicating with a first network node (shown as TRP$_1$) and a second network node (shown as TRP$_2$). As described herein, the first network node and the second network node may be configured to generate and transmit OTFS-precoded TRS transmissions to improve Doppler frequency estimation at the UE in an HST or other high mobility scenario.

In some aspects, as shown by reference number 710, the UE and the network nodes may communicate to establish an OTFS precoding configuration. For example, in some aspects, the UE may transmit, to the first network node, the second network node, or another network node (e.g., a DU or a CU that controls the first network node and the second network node), signaling that indicates whether the UE has a capability to support an OTFS-precoded TRS. Accordingly, support for an OTFS-precoded TRS may be considered a UE capability that is signaled to a wireless network, where the network nodes may generate and transmit OTFS-precoded TRS transmissions to the UE only in cases where the UE capability signaling indicates that the UE has the capability to support an OTFS-precoded TRS. Otherwise, the network nodes may use an OFDM waveform or another suitable waveform for the TRS transmissions. Furthermore, in cases where the capability signaling from the UE indicates that the UE supports an OTFS-precoded TRS, the first network node, the second network node, or another network node that controls the first network node and the second network node may transmit, to the UE, signaling to indicate a configuration for an OTFS-precoding to be applied to a TRS transmission. For example, the signaling may be semi-static signaling (e.g., a radio resource control (RRC) message) or dynamic signaling (e.g., a medium access control (MAC) control element (MAC-CE) or downlink control information (DCI)) that indicates the OTFS precoding to be applied to TRS transmissions and one or more locations (e.g., symbols) in a slot that will carry the TRS (e.g., the fifth symbol in the examples shown in FIG. 6). Furthermore, in some aspects, the first network node, the second network node, or another network node that controls the first network node and the second network node may select a frequency allocation for the TRS (e.g., a discontinuous frequency allocation with uniformly spaced subcarriers, a continuous frequency allocation with or without guard bands at the edge subcarriers) based on a channel delay and/or Doppler spread, and the selected frequency allocation may be indicated to the UE through RRC, MAC-CE, DCI, or other suitable signaling.

Accordingly, as further shown in FIG. 7, and by reference numbers 720-1 and 720-2, the first network node and the second network node may each precode a respective TRS transmission using a delay-Doppler precoder. For example, the first network node and the second network node may use one or more techniques described above in connection with FIGS. 4A-4B and FIG. 6 to apply an OTFS precoding to a plurality of TRS resource samples that are allocated in a delay-Doppler domain in order to obtain a plurality of TRS symbols with the OTFS precoding (e.g., where TRS symbols are uniformly spaced in the time domain). As further shown in FIG. 7, and by reference numbers 730-1 and 730-2, the first network node and the second network node may perform the respective transmissions of the OTFS-precoded TRS transmissions, which include OTFS-precoded TRS symbols at uniform time intervals. In some aspects, the respective transmissions of the OTFS-precoded TRS transmissions from the first network node and the second network node may be performed in an SFN manner (e.g., using the same time and frequency resources) or a non-SFN manner (e.g., where the first network node and the second network node transmit the respective OTFS-precoded TRS transmissions using different time and/or frequency resources).

As further shown in FIG. 7, and by reference number 740, the UE may decode the TRS transmission from the first network node and the TRS transmission from the second network node using a delay-Doppler decoder (e.g., using one or more techniques described above in connection with FIGS. 4A-4B and FIG. 6). Accordingly, as shown by reference number 750, the UE may estimate a first Doppler frequency from the first network node based on the decoded TRS transmission from the first network node and may estimate a second Doppler frequency from the second network node based on the decoded TRS transmission from the second network node. As shown by reference number 760, the UE may then transmit an SRS to indicate the estimated Doppler frequency per network node. For example, the UE may implicitly indicate the estimated Doppler frequency by transmitting the SRS at a frequency of $f_c+(f_{d2}-f_{d1}/2)$, where $f_c$ is a center carrier frequency, $-f_{d1}$ is the estimated Doppler frequency from the first network node, and $f_{d2}$ is the estimated Doppler frequency from the second network node. Alternatively, the SRS transmitted to the first network node and the second network node may explicitly indicate the estimated Doppler frequency associated with each respective network node. In either case, as shown by reference number 770, the first network node and the second network node may then use the estimated Doppler frequency to pre-compensate PDSCH and DMRS transmissions to the UE, which are performed in an SFN manner such that the PDSCH and DMRS transmissions from the first network node and the second network node may be constructively recombined at the UE.

As indicated above, FIG. 7 is provided as an example. Other examples may differ from what is described with regard to FIG. 7.

Figure 8:
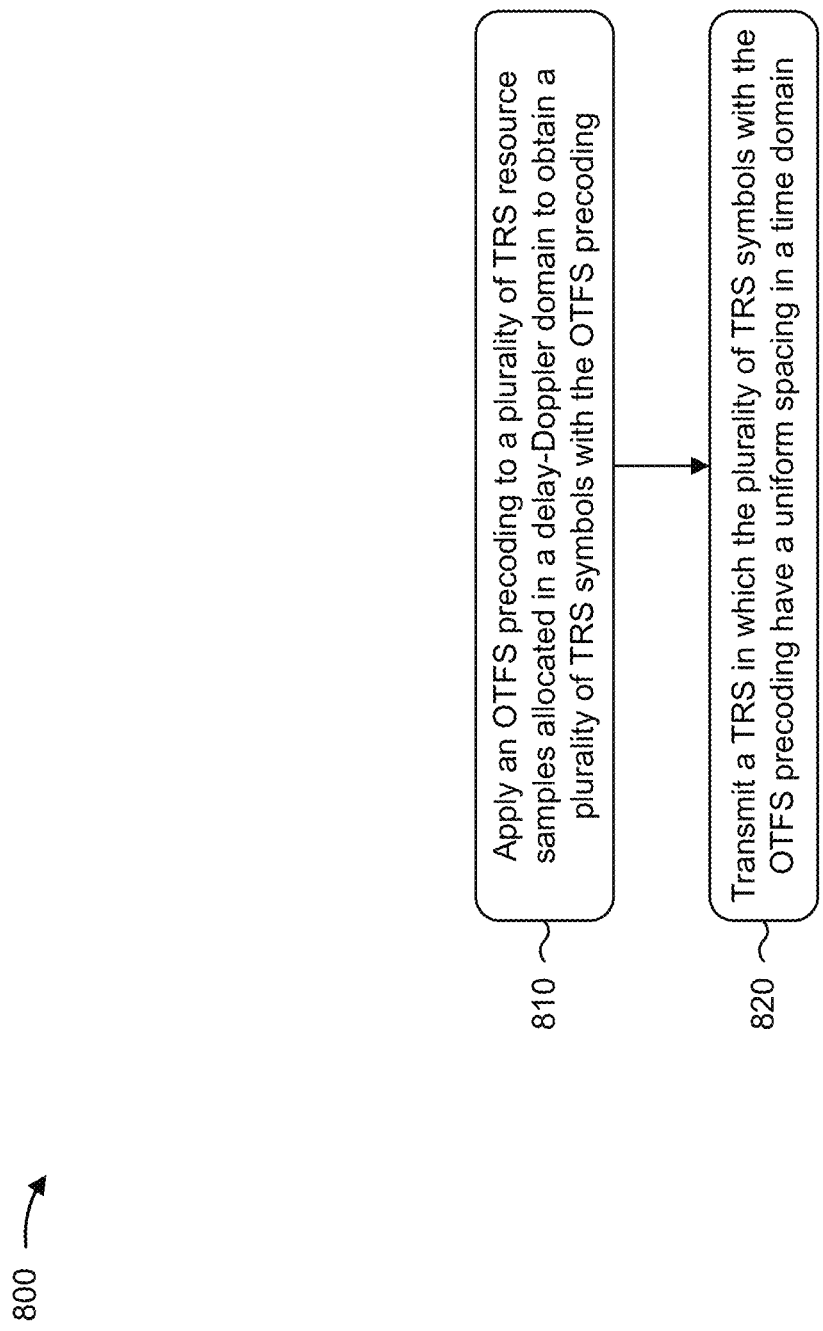
FIGS. 8-9 are diagrams illustrating example processes associated with an OTFS precoding for a TRS, in accordance with the present disclosure.

FIG. 8 is a diagram illustrating an example process 800 performed, for example, by a first network node, in accordance with the present disclosure. Example process 800 is an example where the first network node (e.g., a base station, TRP, CU, DU, RU, or the like) performs operations associated with OTFS precoding for a TRS.

As shown in FIG. 8, in some aspects, process 800 may include applying an OTFS precoding to a plurality of TRS resource samples allocated in a delay-Doppler domain to obtain a plurality of TRS symbols with the OTFS precoding (block 810). For example, the first network node (e.g., using communication manager 140 and/or OTFS precoding component 1008, depicted in FIG. 10) may apply an OTFS precoding to a plurality of TRS resource samples allocated in a delay-Doppler domain to obtain a plurality of TRS symbols with the OTFS precoding, as described above.

As further shown in FIG. 8, in some aspects, process 800 may include transmitting, to a second network node, a TRS in which the plurality of TRS symbols with the OTFS precoding have a uniform spacing in a time domain (block 820). For example, the first network node (e.g., using communication manager 140 and/or transmission component 1004, depicted in FIG. 10) may transmit, to a second network node, a TRS in which the plurality of TRS symbols with the OTFS precoding have a uniform spacing in a time domain, as described above.

Process 800 may include additional aspects, such as any single aspect or any combination of aspects described below and/or in connection with one or more other processes described elsewhere herein.

In a first aspect, the TRS is transmitted in a plurality of slots, and each respective slot of the plurality of slots includes a single respective TRS symbol of the plurality of TRS symbols.

In a second aspect, alone or in combination with the first aspect, the plurality of TRS symbols occupy a plurality of subcarriers that have a uniform spacing in a frequency domain.

In a third aspect, alone or in combination with one or more of the first and second aspects, the plurality of TRS symbols occupy a continuous plurality of subcarriers in a frequency domain.

In a fourth aspect, alone or in combination with one or more of the first through third aspects, the continuous plurality of subcarriers includes edge subcarriers that are occupied by guard symbols.

In a fifth aspect, alone or in combination with one or more of the first through fourth aspects, the guard symbols include zeros or a cyclic prefix portion of the TRS.

In a sixth aspect, alone or in combination with one or more of the first through fifth aspects, applying the OTFS precoding to the plurality of TRS resource samples includes applying an ISFFT to the plurality of TRS resource samples to convert the plurality of TRS resource samples from the delay-Doppler domain to a time-frequency domain.

In a seventh aspect, alone or in combination with one or more of the first through sixth aspects, the ISFFT is applied to a data structure in which the plurality of TRS resource samples are positioned.

In an eighth aspect, alone or in combination with one or more of the first through seventh aspects, the data structure is a matrix comprising M×N matrix entries, where M is an integer greater than one and N is an integer greater than one, each respective matrix entry in a first column of the M×N matrix entries includes a respective TRS resource sample of the plurality of TRS resource samples, and each respective matrix entry in each column other than the first column of the M×N matrix entries includes a zero.

In a ninth aspect, alone or in combination with one or more of the first through eighth aspects, process 800 includes transmitting signaling to the second network node, wherein the signaling indicates a respective location for one or more respective TRS symbols of the plurality of TRS symbols within one or more respective slots.

In a tenth aspect, alone or in combination with one or more of the first through ninth aspects, process 800 includes transmitting, to the second network node, signaling that indicates a resource allocation associated with the plurality of TRS symbols in a frequency domain.

In an eleventh aspect, alone or in combination with one or more of the first through tenth aspects, process 800 includes selecting a resource allocation associated with the plurality of TRS symbols in a frequency domain based on a channel delay or a Doppler spread between the first network node and the second network node.

In a twelfth aspect, alone or in combination with one or more of the first through eleventh aspects, process 800 includes receiving, from the second network node, signaling that indicates whether the second network node has a capability to support an OTFS-precoded TRS, wherein the OTFS precoding is applied based on the signaling that indicates whether the second network node has the capability to support the OTFS-precoded TRS.

In a thirteenth aspect, alone or in combination with one or more of the first through twelfth aspects, the signaling that indicates whether the second network node has the capability to support the OTFS-precoded TRS indicates that the second network node has the capability to support the OTFS-precoded TRS.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
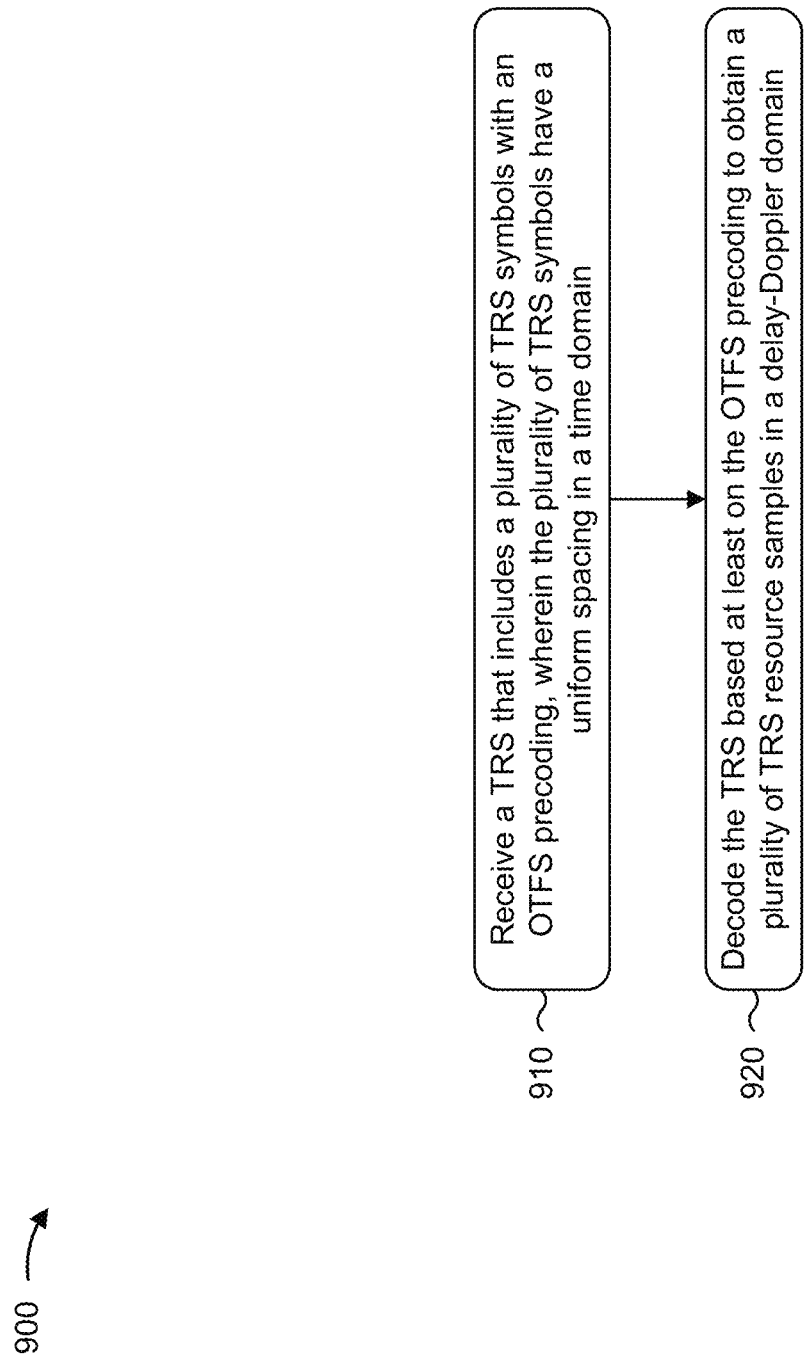

FIG. 9 is a diagram illustrating an example process 900 performed, for example, by a first network node, in accordance with the present disclosure. Example process 900 is an example where the first network node (e.g., a UE) performs operations associated with OTFS precoding for a TRS.

As shown in FIG. 9, in some aspects, process 900 may include receiving, from a second network node, a TRS that includes a plurality of TRS symbols with an OTFS precoding, wherein the plurality of TRS symbols have a uniform spacing in a time domain (block 910). For example, the first network node (e.g., using communication manager 150 and/or reception component 1102, depicted in FIG. 11) may receive, from a second network node, a TRS that includes a plurality of TRS symbols with an OTFS precoding, wherein the plurality of TRS symbols have a uniform spacing in a time domain, as described above.

As further shown in FIG. 9, in some aspects, process 900 may include decoding the TRS based on the OTFS precoding to obtain a plurality of TRS resource samples in a delay-Doppler domain (block 920). For example, the first network node (e.g., using communication manager 150 and/or OTFS decoding component 1108, depicted in FIG. 11) may decode the TRS based on the OTFS precoding to obtain a plurality of TRS resource samples in a delay-Doppler domain, as described above.

Process 900 may include additional aspects, such as any single aspect or any combination of aspects described below and/or in connection with one or more other processes described elsewhere herein.

In a first aspect, the TRS is received in a plurality of slots, and each respective slot of the plurality of slots includes a single respective TRS symbol of the plurality of TRS symbols.

In a second aspect, alone or in combination with the first aspect, the plurality of TRS symbols occupy a plurality of subcarriers that have a uniform spacing in a frequency domain.

In a third aspect, alone or in combination with one or more of the first and second aspects, the plurality of TRS symbols occupy a continuous plurality of subcarriers in a frequency domain.

In a fourth aspect, alone or in combination with one or more of the first through third aspects, the continuous plurality of subcarriers includes edge subcarriers that are occupied by guard symbols.

In a fifth aspect, alone or in combination with one or more of the first through fourth aspects, the guard symbols include zeros or a cyclic prefix portion of the TRS.

In a sixth aspect, alone or in combination with one or more of the first through fifth aspects, decoding the TRS includes applying an SFFT to the plurality of TRS symbols to convert the plurality of TRS symbols from a time-frequency domain to the delay-Doppler domain.

In a seventh aspect, alone or in combination with one or more of the first through sixth aspects, process 900 includes receiving signaling from the second network node, wherein the signaling indicates a respective location for one or more respective TRS symbols of the plurality of TRS symbols within one or more respective slots.

In an eighth aspect, alone or in combination with one or more of the first through seventh aspects, process 900 includes receiving, from the second network node, signaling that indicates a resource allocation associated with the plurality of TRS symbols in a frequency domain.

In a ninth aspect, alone or in combination with one or more of the first through eighth aspects, process 900 includes transmitting, to the second network node, signaling that indicates whether the first network node has a capability to support an OTFS-precoded TRS.

In a tenth aspect, alone or in combination with one or more of the first through ninth aspects, process 900 includes estimating a Doppler frequency from the second network node based on the plurality of TRS resource samples in the delay-Doppler domain.

In an eleventh aspect, alone or in combination with one or more of the first through tenth aspects, process 900 includes transmitting, to the second network node, an SRS that indicates the estimated Doppler frequency from the second network node.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
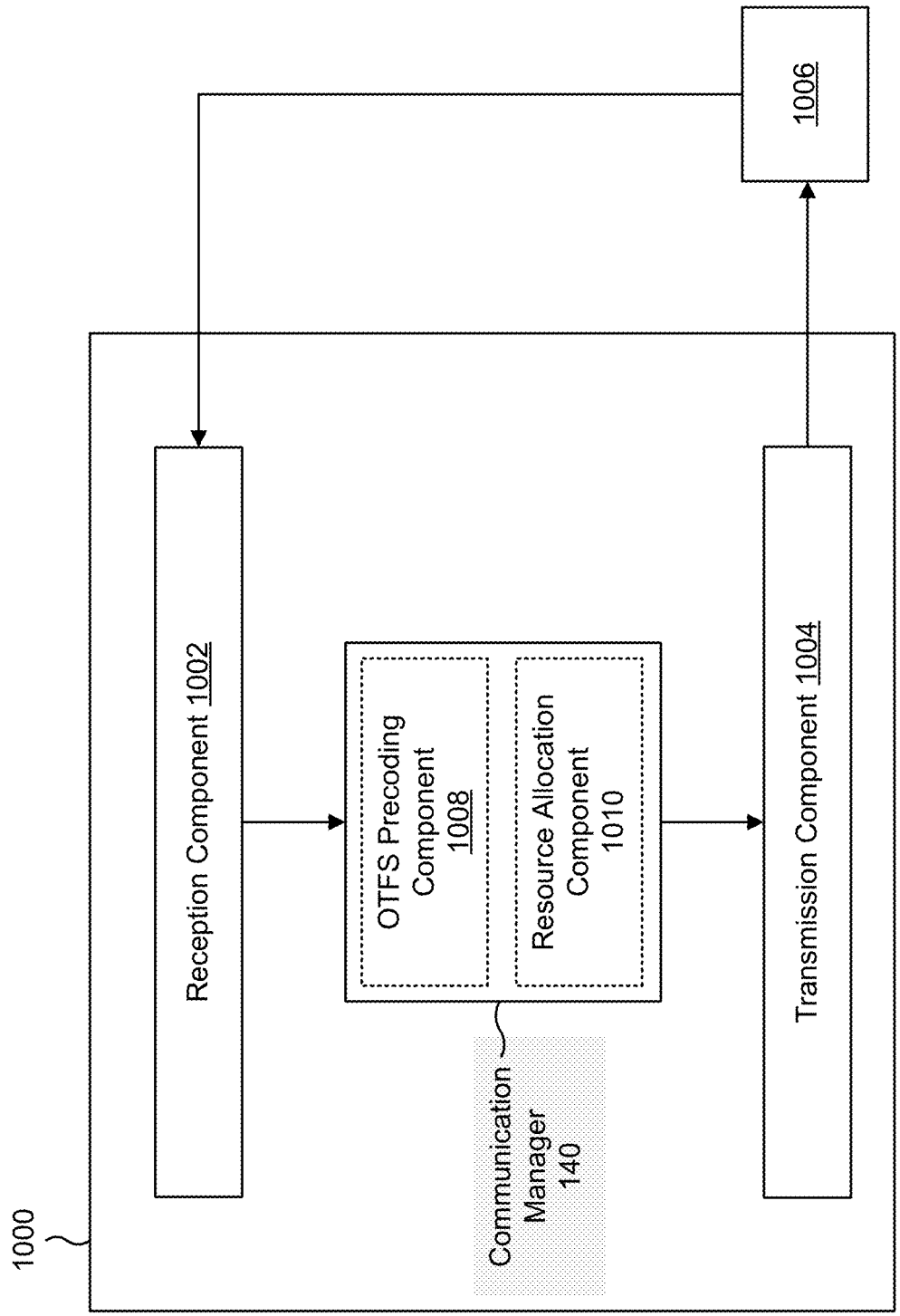
FIGS. 10-11 are diagrams of example apparatuses for wireless communication, in accordance with the present disclosure.

FIG. 10 is a diagram of an example apparatus 1000 for wireless communication. The apparatus 1000 may be a first network node (e.g., a base station, TRP, CU, DU, RU, or the like), or a first network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an OTFS precoding component 1008 or a resource allocation component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the TRP described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the TRP described in connection with FIG. 2. In some aspects, the transmission component 1004 may be co-located with the reception component 1002 in a transceiver.

The OTFS precoding component 1008 may apply an OTFS precoding to a plurality of TRS resource samples allocated in a delay-Doppler domain to obtain a plurality of TRS symbols with the OTFS precoding. The transmission component 1004 may transmit, to a second network node, a TRS in which the plurality of TRS symbols with the OTFS precoding have a uniform spacing in a time domain.

The transmission component 1004 may transmit signaling to the second network node, wherein the signaling indicates a respective location for one or more respective TRS symbols of the plurality of TRS symbols within one or more respective slots.

The transmission component 1004 may transmit, to the second network node, signaling that indicates a resource allocation associated with the plurality of TRS symbols in a frequency domain.

The resource allocation component 1010 may select a resource allocation associated with the plurality of TRS symbols in a frequency domain based on a channel delay or a Doppler spread between the first network node and the second network node.

The reception component 1002 may receive, from the second network node, signaling that indicates whether the second network node has a capability to support an OTFS-precoded TRS, wherein the OTFS precoding is applied based on the signaling that indicates whether the second network node has the capability to support the OTFS-precoded TRS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
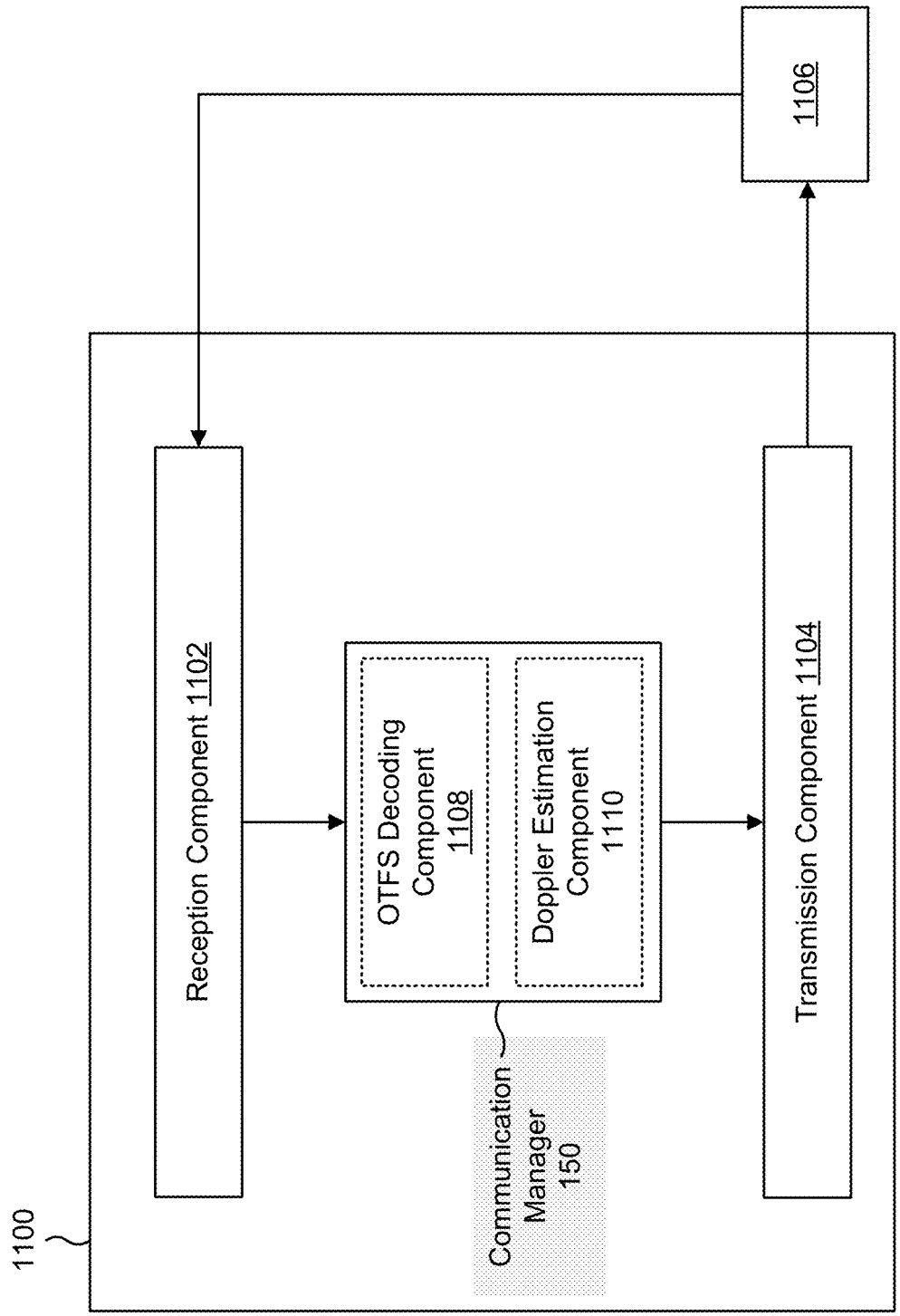

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an OTFS decoding component 1108 or a Doppler estimation component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a second network node, a TRS that includes a plurality of TRS symbols with an OTFS precoding, wherein the plurality of TRS symbols have a uniform spacing in a time domain. The OTFS decoding component 1108 may decode the TRS based on the OTFS precoding to obtain a plurality of TRS resource samples in a delay-Doppler domain.

The reception component 1102 may receive signaling from the second network node, wherein the signaling indicates a respective location for one or more respective TRS symbols of the plurality of TRS symbols within one or more respective slots.

The reception component 1102 may receive, from the second network node, signaling that indicates a resource allocation associated with the plurality of TRS symbols in a frequency domain.

The transmission component 1104 may transmit, to the second network node, signaling that indicates whether the first network node has a capability to support an OTFS-precoded TRS.

The Doppler estimation component 1110 may estimate a Doppler frequency from the second network node based on the plurality of TRS resource samples in the delay-Doppler domain.

The transmission component 1104 may transmit, to the second network node, an SRS that indicates the estimated Doppler frequency from the second network node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first network node, comprising: applying an OTFS precoding to a plurality of TRS resource samples allocated in a delay-Doppler domain to obtain a plurality of TRS symbols with the OTFS precoding; and transmitting, to a second network node, a TRS in which the plurality of TRS symbols with the OTFS precoding have a uniform spacing in a time domain.

Aspect 2: The method of Aspect 1, wherein the TRS is transmitted in a plurality of slots, and wherein each respective slot of the plurality of slots includes a single respective TRS symbol of the plurality of TRS symbols.

Aspect 3: The method of any of Aspects 1-2, wherein the plurality of TRS symbols occupy a plurality of subcarriers that have a uniform spacing in a frequency domain.

Aspect 4: The method of any of Aspects 1-2, wherein the plurality of TRS symbols occupy a continuous plurality of subcarriers in a frequency domain.

Aspect 5: The method of Aspect 4, wherein the continuous plurality of subcarriers includes edge subcarriers that are occupied by guard symbols.

Aspect 6: The method of Aspect 5, wherein the guard symbols include zeros or a cyclic prefix portion of the TRS.

Aspect 7: The method of any of Aspects 1-6, wherein applying the OTFS precoding to the plurality of TRS resource samples includes applying an ISFFT to the plurality of TRS resource samples to convert the plurality of TRS resource samples from the delay-Doppler domain to a time-frequency domain.

Aspect 8: The method of Aspect 7, wherein the ISFFT is applied to a data structure in which the plurality of TRS resource samples are positioned.

Aspect 9: The method of Aspect 8, wherein the data structure is a matrix comprising M×N matrix entries, wherein M is an integer greater than one and N is an integer greater than one, wherein each respective matrix entry in a first column of the M×N matrix entries includes a respective TRS resource sample of the plurality of TRS resource samples, and wherein each respective matrix entry in each column other than the first column of the M×N matrix entries includes a zero.

Aspect 10: The method of any of Aspects 1-9, further comprising: transmitting signaling to the second network node, wherein the signaling indicates a respective location for one or more respective TRS symbols of the plurality of TRS symbols within one or more respective slots.

Aspect 11: The method of any of Aspects 1-10, further comprising: transmitting, to the second network node, signaling that indicates a resource allocation associated with the plurality of TRS symbols in a frequency domain.

Aspect 12: The method of any of Aspects 1-11, further comprising: selecting a resource allocation associated with the plurality of TRS symbols in a frequency domain based on a channel delay or a Doppler spread between the first network node and the second network node.

Aspect 13: The method of any of Aspects 1-12, further comprising: receiving, from the second network node, signaling that indicates whether the second network node has a capability to support an OTFS-precoded TRS, wherein the OTFS precoding is applied based on the signaling that indicates whether the second network node has the capability to support the OTFS-precoded TRS.

Aspect 14: The method of Aspect 13, wherein the signaling that indicates whether the second network node has the capability to support the OTFS-precoded TRS indicates that the second network node has the capability to support the OTFS-precoded TRS.

Aspect 15: A method of wireless communication performed by a first network node, comprising: receiving, from a second network node, a TRS that includes a plurality of TRS symbols with an OTFS precoding, wherein the plurality of TRS symbols have a uniform spacing in a time domain; and decoding the TRS based on the OTFS precoding to obtain a plurality of TRS resource samples in a delay-Doppler domain.

Aspect 16: The method of Aspect 15, wherein the TRS is received in a plurality of slots, and wherein each respective slot of the plurality of slots includes a single respective TRS symbol of the plurality of TRS symbols.

Aspect 17: The method of any of Aspects 15-16, wherein the plurality of TRS symbols occupy a plurality of subcarriers that have a uniform spacing in a frequency domain.

Aspect 18: The method of any of Aspects 15-16, wherein the plurality of TRS symbols occupy a continuous plurality of subcarriers in a frequency domain.

Aspect 19: The method of Aspect 18, wherein the continuous plurality of subcarriers includes edge subcarriers that are occupied by guard symbols.

Aspect 20: The method of Aspect 19, wherein the guard symbols include zeros or a cyclic prefix portion of the TRS.

Aspect 21: The method of any of Aspects 15-20, wherein decoding the TRS includes applying an SFFT to the plurality of TRS symbols to convert the plurality of TRS symbols from a time-frequency domain to the delay-Doppler domain.

Aspect 22: The method of any of Aspects 15-21, further comprising: receiving signaling from the second network node, wherein the signaling indicates a respective location for one or more respective TRS symbols of the plurality of TRS symbols within one or more respective slots.

Aspect 23: The method of any of Aspects 15-22, further comprising: receiving, from the second network node, signaling that indicates a resource allocation associated with the plurality of TRS symbols in a frequency domain.

Aspect 24: The method of any of Aspects 15-23, further comprising: transmitting, to the second network node, signaling that indicates whether the first network node has a capability to support an OTFS-precoded TRS.

Aspect 25: The method of any of Aspects 15-24, further comprising: estimating a Doppler frequency from the second network node based on the plurality of TRS resource samples in the delay-Doppler domain.

Aspect 26: The method of Aspect 25, further comprising: transmitting, to the second network node, an SRS that indicates the estimated Doppler frequency from the second network node.

Aspect 27: An apparatus for wireless communication at a device, comprising a processor; memory coupled with the processor; and instructions stored in the memory and executable by the processor to cause the apparatus to perform the method of one or more of Aspects 1-14.

Aspect 28: A device for wireless communication, comprising a memory and one or more processors coupled to the memory, the one or more processors configured to perform the method of one or more of Aspects 1-14.

Aspect 29: An apparatus for wireless communication, comprising at least one means for performing the method of one or more of Aspects 1-14.

Aspect 30: A non-transitory computer-readable medium storing code for wireless communication, the code comprising instructions executable by a processor to perform the method of one or more of Aspects 1-14.

Aspect 31: A non-transitory computer-readable medium storing a set of instructions for wireless communication, the set of instructions comprising one or more instructions that, when executed by one or more processors of a device, cause the device to perform the method of one or more of Aspects 1-14.

Aspect 32: An apparatus for wireless communication at a device, comprising a processor; memory coupled with the processor; and instructions stored in the memory and executable by the processor to cause the apparatus to perform the method of one or more of Aspects 15-26.

Aspect 33: A device for wireless communication, comprising a memory and one or more processors coupled to the memory, the one or more processors configured to perform the method of one or more of Aspects 15-26.

Aspect 34: An apparatus for wireless communication, comprising at least one means for performing the method of one or more of Aspects 15-26.

Aspect 35: A non-transitory computer-readable medium storing code for wireless communication, the code comprising instructions executable by a processor to perform the method of one or more of Aspects 15-26.

Aspect 36: A non-transitory computer-readable medium storing a set of instructions for wireless communication, the set of instructions comprising one or more instructions that, when executed by one or more processors of a device, cause the device to perform the method of one or more of Aspects 15-26.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. Systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art understand that software and hardware can be designed to implement the systems and/or methods based on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node for wireless communication, comprising:
   a memory; and
   one or more processors communicatively coupled to the memory, wherein the one or more processors are configured to:
      apply an orthogonal time frequency space (OTFS) precoding to a plurality of tracking reference signal (TRS) resource samples allocated in a delay-Doppler domain to obtain a plurality of TRS symbols with the OTFS precoding; and
      transmit, to a second network node, a TRS in which the plurality of TRS symbols with the OTFS precoding have a uniform spacing in a time domain.

2. The first network node of claim 1, wherein the TRS is transmitted in a plurality of slots, and wherein each respective slot of the plurality of slots includes a single respective TRS symbol of the plurality of TRS symbols.

3. The first network node of claim 1, wherein the plurality of TRS symbols occupy a plurality of subcarriers that have a uniform spacing in a frequency domain.

4. The first network node of claim 1, wherein the plurality of TRS symbols occupy a continuous plurality of subcarriers in a frequency domain.

5. The first network node of claim 4, wherein the continuous plurality of subcarriers includes edge subcarriers that are occupied by guard symbols.

6. The first network node of claim 5, wherein the guard symbols include zeros or a cyclic prefix portion of the TRS.

7. The first network node of claim 1, wherein the one or more processors are configured to apply the OTFS precoding to the plurality of TRS resource samples by applying an inverse symplectic fast Fourier transform (ISFFT) to the plurality of TRS resource samples to convert the plurality of TRS resource samples from the delay-Doppler domain to a time-frequency domain.

8. The first network node of claim 7, wherein the ISFFT is applied to a data structure in which the plurality of TRS resource samples are positioned.

9. The first network node of claim 8, wherein the data structure is a matrix comprising M×N matrix entries, wherein M is an integer greater than one and N is an integer greater than one, wherein each respective matrix entry in a first column of the M×N matrix entries includes a respective TRS resource sample of the plurality of TRS resource samples, and wherein each respective matrix entry in each column other than the first column of the M×N matrix entries includes a zero.

10. The first network node of claim 1, wherein the one or more processors are further configured to:
    transmit signaling to the second network node, wherein the signaling indicates a respective location for one or more respective TRS symbols of the plurality of TRS symbols within one or more respective slots.

11. The first network node of claim 1, wherein the one or more processors are further configured to:
    transmit, to the second network node, signaling that indicates a resource allocation associated with the plurality of TRS symbols in a frequency domain.

12. The first network node of claim 1, wherein the one or more processors are further configured to:
    select a resource allocation associated with the plurality of TRS symbols in a frequency domain based on a channel delay or a Doppler spread between the first network node and the second network node.

13. The first network node of claim 1, wherein the one or more processors are further configured to:
    receive, from the second network node, signaling that indicates whether the second network node has a capability to support an OTFS-precoded TRS, wherein the OTFS precoding is applied based on the signaling that indicates whether the second network node has the capability to support the OTFS-precoded TRS.

14. The first network node of claim 13, wherein the signaling that indicates whether the second network node has the capability to support the OTFS-precoded TRS indicates that the second network node has the capability to support the OTFS-precoded TRS.

15. A first network node of wireless communication performed by a first network node, comprising:
    a memory; and
    one or more processors communicatively coupled to the memory, wherein the one or more processors are configured to:
       receive, from a second network node, a tracking reference signal (TRS) that includes a plurality of TRS symbols with an orthogonal time frequency space (OTFS) precoding, wherein the plurality of TRS symbols have a uniform spacing in a time domain; and
       decode the TRS based on the OTFS precoding to obtain a plurality of TRS resource samples in a delay-Doppler domain.

16. The first network node of claim 15, wherein the TRS is received in a plurality of slots, and wherein each respective slot of the plurality of slots includes a single respective TRS symbol of the plurality of TRS symbols.

17. The first network node of claim 15, wherein the plurality of TRS symbols occupy a plurality of subcarriers that have a uniform spacing in a frequency domain.

18. The first network node of claim 15, wherein the plurality of TRS symbols occupy a continuous plurality of subcarriers in a frequency domain.

19. The first network node of claim 18, wherein the continuous plurality of subcarriers includes edge subcarriers that are occupied by guard symbols.

20. The first network node of claim 19, wherein the guard symbols include zeros or a cyclic prefix portion of the TRS.

21. The first network node of claim 15, wherein the one or more processors are configured to decode the TRS by applying a symplectic fast Fourier transform (SFFT) to the plurality of TRS symbols to convert the plurality of TRS symbols from a time-frequency domain to the delay-Doppler domain.

22. The first network node of claim 15, wherein the one or more processors are further configured to:
receive signaling from the second network node, wherein the signaling indicates a respective location for one or more respective TRS symbols of the plurality of TRS symbols within one or more respective slots.

23. The first network node of claim 15, wherein the one or more processors are further configured to:
receive, from the second network node, signaling that indicates a resource allocation associated with the plurality of TRS symbols in a frequency domain.

24. The first network node of claim 15, wherein the one or more processors are further configured to:
transmit, to the second network node, signaling that indicates whether the first network node has a capability to support an OTFS-precoded TRS.

25. The first network node of claim 15, wherein the one or more processors are further configured to:
estimate a Doppler frequency from the second network node based on the plurality of TRS resource samples in the delay-Doppler domain.

26. The first network node of claim 25, wherein the one or more processors are further configured to:
transmit, to the second network node, a sounding reference signal that indicates the estimated Doppler frequency from the second network node.

27. A method of wireless communication performed by a first network node, comprising:
applying an orthogonal time frequency space (OTFS) precoding to a plurality of tracking reference signal (TRS) resource samples allocated in a delay-Doppler domain to obtain a plurality of TRS symbols with the OTFS precoding; and
transmitting, to a second network node, a TRS in which the plurality of TRS symbols with the OTFS precoding have a uniform spacing in a time domain.

28. The method of claim 27, wherein the TRS is transmitted in a plurality of slots, and wherein each respective slot of the plurality of slots includes a single respective TRS symbol of the plurality of TRS symbols.

29. A method of wireless communication performed by a first network node, comprising:
receiving, from a second network node, a tracking reference signal (TRS) that includes a plurality of TRS symbols with an orthogonal time frequency space (OTFS) precoding, wherein the plurality of TRS symbols have a uniform spacing in a time domain; and
decoding the TRS based on the OTFS precoding to obtain a plurality of TRS resource samples in a delay-Doppler domain.

30. The method of claim 29, wherein the TRS is received in a plurality of slots, and wherein each respective slot of the plurality of slots includes a single respective TRS symbol of the plurality of TRS symbols.

* * * * *